(12) United States Patent
Ishibashi et al.

(10) Patent No.: US 8,208,945 B2
(45) Date of Patent: Jun. 26, 2012

(54) INFORMATION PROCESSING DEVICE AND METHOD, PROGRAM, AND RECORDING MEDIUM

(75) Inventors: Yoshihito Ishibashi, Tokyo (JP); Susumu Kusakabe, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 1178 days.

(21) Appl. No.: 11/490,318

(22) Filed: Jul. 21, 2006

(65) Prior Publication Data

US 2007/0072622 A1    Mar. 29, 2007

(30) Foreign Application Priority Data

Jul. 25, 2005   (JP) ................................. 2005-215061
Aug. 23, 2005  (JP) ................................. 2005-241409
Jun. 30, 2006  (JP) ................................. 2006-180848

(51) Int. Cl.
*H04M 1/00*     (2006.01)
*H04W 4/00*     (2009.01)
(52) U.S. Cl. ..................... 455/456.2; 455/434
(58) Field of Classification Search ............... 455/414.1, 455/456.1–456.6, 558, 414.2, 414.4, 457, 455/434, 404.2, 552.1, 41.1; 705/14, 5, 18; 709/216, 217
See application file for complete search history.

(56) References Cited

U.S. PATENT DOCUMENTS

| | | | |
|---|---|---|---|
| 5,914,701 A | 6/1999 | Gersheneld et al. | |
| 6,385,465 B1 * | 5/2002 | Yoshioka | ...................... 455/564 |
| 6,473,790 B1 * | 10/2002 | Tagi | .............................. 709/216 |
| 6,650,902 B1 * | 11/2003 | Richton | ..................... 455/456.3 |
| 6,757,544 B2 * | 6/2004 | Rangarajan et al. | ........ 455/456.1 |
| 6,993,326 B2 * | 1/2006 | Link et al. | ................... 455/414.1 |
| 2002/0028671 A1 * | 3/2002 | I' Anson et al. | .............. 455/414 |
| 2002/0082002 A1 * | 6/2002 | Fujii | .............................. 455/419 |
| 2005/0245271 A1 * | 11/2005 | Vesuna | ..................... 455/456.1 |
| 2006/0277078 A1 * | 12/2006 | Ohmori et al. | .................... 705/5 |

FOREIGN PATENT DOCUMENTS

| | | |
|---|---|---|
| JP | 10-229357 | 8/1998 |
| JP | 11-509380 | 8/1999 |
| JP | 2000-293506 | 10/2000 |
| JP | 2000-293540 | 10/2000 |
| JP | 2000-324542 | 11/2000 |
| JP | 2001-351191 | 12/2001 |
| JP | 2002-318957 | 10/2002 |
| JP | 2003-264858 | 9/2003 |
| JP | 2003-296875 | 10/2003 |
| JP | 2003-299138 | 10/2003 |
| JP | 2005-167736 | 6/2005 |
| WO | WO 02/25984 A1 | 3/2002 |
| WO | WO 2004/010651 A1 | 1/2004 |

* cited by examiner

*Primary Examiner* — Kiet Doan
(74) *Attorney, Agent, or Firm* — Finnegan, Henderson, Farabow, Garrett & Dunner, L.L.P.

(57) ABSTRACT

An information processing device for transmitting information to be provided to a user to a terminal held by the user, including: current position obtaining means for obtaining the current position of the user of the terminal, based on information transmitted from a signal processing device capable of communicating with the terminal, of a signal processing device connected to itself; searching means for searching the information to be provided to the user from the plurality of information that can be read out by itself, based on the current position information obtained by the current position obtaining means; and transmission means for transmitting the information searched with the searching means to the terminal.

18 Claims, 32 Drawing Sheets

| FREQUENCY f [Hz] | RECEPTION LOAD Rr [Ω] | CAPACITANCE [F] | EXECUTION VOLTAGE Vrms [V] |
|---|---|---|---|
| 1.0E+06 | 1.0E+04 | 1.0E-13 | 0.013 |
| 1.0E+06 | 1.0E+04 | 1.0E-12 | 0.125 |
| 1.0E+06 | 1.0E+04 | 1.0E-11 | 1.064 |
| 1.0E+06 | 1.0E+05 | 1.0E-13 | 0.125 |
| 1.0E+06 | 1.0E+05 | 1.0E-12 | 1.064 |
| 1.0E+06 | 1.0E+05 | 1.0E-11 | 1.975 |
| 1.0E+06 | 1.0E+06 | 1.0E-13 | 1.064 |
| 1.0E+06 | 1.0E+06 | 1.0E-12 | 1.975 |
| 1.0E+06 | 1.0E+06 | 1.0E-11 | 2.000 |
| 1.0E+07 | 1.0E+04 | 1.0E-13 | 0.125 |
| 1.0E+07 | 1.0E+04 | 1.0E-12 | 1.064 |
| 1.0E+07 | 1.0E+04 | 1.0E-11 | 1.975 |
| 1.0E+07 | 1.0E+05 | 1.0E-13 | 1.064 |
| 1.0E+07 | 1.0E+05 | 1.0E-12 | 1.975 |
| 1.0E+07 | 1.0E+05 | 1.0E-11 | 2.000 |
| 1.0E+07 | 1.0E+06 | 1.0E-13 | 1.975 |
| 1.0E+07 | 1.0E+06 | 1.0E-12 | 2.000 |
| 1.0E+07 | 1.0E+06 | 1.0E-11 | 2.000 |
| 1.0E+08 | 1.0E+04 | 1.0E-13 | 1.064 |
| 1.0E+08 | 1.0E+04 | 1.0E-12 | 1.975 |
| 1.0E+08 | 1.0E+04 | 1.0E-11 | 2.000 |
| 1.0E+08 | 1.0E+05 | 1.0E-13 | 1.975 |
| 1.0E+08 | 1.0E+05 | 1.0E-12 | 2.000 |
| 1.0E+08 | 1.0E+05 | 1.0E-11 | 2.000 |
| 1.0E+08 | 1.0E+06 | 1.0E-13 | 2.000 |
| 1.0E+08 | 1.0E+06 | 1.0E-12 | 2.000 |
| 1.0E+08 | 1.0E+06 | 1.0E-11 | 2.000 |

FIG. 23

| CONTENT | IMAGE, AUDIO, TEXT DATA |
|---|---|
| ADVERTISING | IMAGE, AUDIO, TEXT DATA, URL, EMAIL INFORMATION AND SO FORTH |

FIG. 24

| CONTENT CHANNEL | CONTENT | | | | |
|---|---|---|---|---|---|
| ADVERTISING CHANNEL 1 | CM1-1 | CM1-2 | CM1-3 | ... | CM1-i |
| ADVERTISING CHANNEL 2 | CM2-1 | CM2-2 | CM2-3 | ... | CM2-i |
| ADVERTISING CHANNEL 3 | CM3-1 | CM3-2 | CM3-3 | ... | CM3-i |
| ... | ... | ... | ... | ... | ... |

FIG. 29

| ADVERTISING CODE | CMn-1 | CMn-2 | CMn-3 | ... |
|---|---|---|---|---|
| COUPON | DISCOUNT | CASH BACK | — | ... |
| ADVERTISING SELECTION | OFF | ON | ON | ... |
| ADVERTISING REPRODUCING | OFF | ON | OFF | ... |

| ADVERTISING CODE | CMn-1 | CMn-2 | CMn-3 | ... |
|---|---|---|---|---|
| NUMBER OF TIMES VIEWED/LISTENED TO | 25 | 71 | 48 | ... |

FIG. 35

| CONTENT INFORMATION | | |
|---|---|---|
| | CONTENT ID | |
| | DAY CREATED | |
| | CREATOR INFORMATION | |
| | CONTENT CATEGORY INFORMATION | |
| COUPON INFORMATION | | |
| | NUMBER OF COUPONS | |
| COUPON | COUPON ID | |
| | DAY CREATED, EFFECTIVE DATE | |
| | PROVIDER INFORMATION | |
| | COUPON CATEGORY INFORMATION | |
| | ⋮ | |
| | CONTENT ID | |
| | DAY CREATED, EFFECTIVE DATE | |
| | PROVIDER INFORMATION | |
| | COUPON CATEGORY INFORMATION | |

| ID | NUMBER OF TIMES USED |
|---|---|
| 0123456 | 10 |
| 1111111 | 5 |
| 2222222 | 5 |
| 6543210 | 2 |

FIG. 38

| STORE CODE | NUMBER OF TIMES USED |
|---|---|
| 1234 | 7 |
| 3333 | 4 |
| 4444 | 1 |
| 9876 | 1 |

FIG. 39

| STORE CODE/REGION CODE | NUMBER OF TIMES USED |
|---|---|
| 1234/5678 | 4 |
| 1234/5555 | 3 |
| 3333/5678 | 2 |
| 3333/5555 | 2 |
| 4444/5555 | 1 |
| 9876/5678 | 1 |

FIG. 40

| TYPE OF STORE | NUMBER OF TIMES USED |
|---|---|
| RESTAURANT | 4 |
| CONVENIENCE STORE | 2 |
| BAR | 8 |
| KARAOKE SHOP | 7 |

FIG. 41

| PREFERENCE CATEGORY | NUMBER OF TIMES USED |
|---|---|
| WESTERN RESTAURANT | 3 |
| JAPANESE RESTAURANT | 3 |
| JAPANESE BAR | 8 |
| WESTERN BAR | 2 |
| KARAOKE SPECIALTY SHOP | 5 |
| KARAOKE SNACK SHOP | 1 |

INFORMATION PROCESSING DEVICE AND METHOD, PROGRAM, AND RECORDING MEDIUM

CROSS REFERENCES TO RELATED APPLICATIONS

The present invention contains subject matter related to Japanese Patent Application JP 2005-215061 filed in the Japanese Patent Office on Jul. 25, 2005, Japanese Patent Application JP 2005-241409 filed in the Japanese Patent Office on Aug. 23, 2005, Japanese Patent Application JP 2006-180484 filed in the Japanese Patent Office on Jun. 30, 2006, the entire contents of which are incorporated herein by reference.

BACKGROUND OF THE INVENTION

1. Field of the Invention

The present invention relates to an information processing device and method, program, and a recording medium, and in particular relates to an information processing device and method, program, and a recording medium to efficiently provide increasingly usable information to users who are mobile.

2. Description of the Related Art

In recent years, IC (integrated circuit) cards have become widely used for passenger tickets for trains and so forth, and these IC cards are increasingly used for shopping and so forth. Hereafter, new services are expected, such as integrating functionality similar to the IC cards into portable telephones that users have, whereby information can be provided to the portable telephone of the user as necessary from railway companies or stores for example, as well as financial data such as fares for passenger tickets or bills for shopping.

On one hand, services using portable telephones have increased over the years, and recently, services are provided whereby a GPS (Global Positioning System) function is loaded on the portable telephone and a navigation path is provided to a user destination.

Additionally, wireless technology has also improved recently, and for example, the realization of data exchange, regardless of device such as personal computers, peripheral equipment, home electric products, or portable telephones, is anticipated, with a wireless transmission method using a 2.4 GHz bandwidth (so-called Bluetooth), and additionally, technology for communication between a sending device and reception device using a conductor other than a normal communication medium such as a person has been proposed (for example, PCT Japanese Translation Patent Publication No. 11-509380 or Japanese Unexamined Patent Application Publication No. 10-229357). It is anticipated that such wireless communication technology will be used with electronic equipment held by a user such as a portable telephone, and new services not previously available will be provided.

SUMMARY OF THE INVENTION

However, information provided to a portable telephone in the past generally included downloads performed by the user or notification emails based on preset conditions, but for example, if various information could be provided according to the destination of the user, for example, usability could increase for both the user and the businessperson.

Also, it has been difficult to specify the position of a user who is mobile while riding on a train for example, using a GPS (Global Positioning System) functionality of the portable telephone and thus navigating the travel path of the user to the destination thereof.

Further, with the technology in PCT Japanese Translation Patent Publication No. 11-509380, a signal is transmitted by a closed circuit being configured with a transmission unit, a human body, a reception unit, and the ground being bound together, and therefore the coupling between the electrode and ground farther from the human body which is the transmitter and receiver is extremely weak, and in actuality a closed circuit is difficult to configure. Also, with the technology in Japanese Unexamined Patent Application Publication No. 10-229357, a signal is transmitted by a closed circuit being configured with a transmission unit, a human body, a reception unit, and the atmosphere being bound together, and therefore in order to couple with the atmosphere, the transmission unit and the reception unit must be located in close proximity to one another.

The present invention has been made with such situations in mind. It has been found desirable to effectively provide information to a mobile user more efficiently.

According to one embodiment of the present invention, an information processing device for transmission of information to be provided to a user to a terminal held by the user, includes: current position obtaining means for obtaining the current position information of the user of the terminal, based on information transmitted from a signal processing device capable of communicating with the terminal, of signal processing devices connected to itself; searching means for searching the information to be provided to the user from the plurality of information that can be read out by itself, based on the current position information obtained by the current position obtaining means; and transmission means for transmitting the information searched with the searching means to the terminal.

The information processing device may further include: information obtaining means for obtaining information relating to the user destination or departure point obtained from the terminal by the signal processing device; wherein the searching means search information to be provided to the user out of the plurality of information that can be read out by itself, based on information relating to a user destination or departure point obtained by the information obtaining means.

The information obtaining means may obtain information relating to the user destination or departure point, based on information corresponding to a passenger ticket for a transportation mode, stored in the terminal, when the user uses the transportation mode.

The searching means may search information, as information to be provided to the user, relating to a product or service to be provided to the user in the vicinity of the establishment of the transportation mode which the user can reach with the passenger ticket.

The information searched by the searching means may include information indicating that a provider of a product or service to be provided to the user provides a predetermined service to a user holding the terminal storing the information different from a service provided to a user not holding the terminal storing the information.

The information indicating that the predetermined service is to be provided may be transmitted as an attachment to the content data transmitted to the terminal.

The information processing device may be configured so that when the information indicating that the predetermined service is to be provided is displayed to the provider of the product or service, the terminal stores the information showing that the information indicating the predetermined service to be provided is displayed on the terminal; the information showing that the information indicating that the predetermined service is to be provided is obtained from the terminal; and information is generated to show the preferences of the user holding the terminal, based on the obtained information.

The content data may be transmitted to the terminal as a one segment broadcast.

The information selected according to a predetermined reference from multiple information searched with the searching means and provided to the user may be displayed to the user via the terminal.

Information may be recorded in the terminal identifying information that has been displayed to the user via the terminal, and the information processing device may further comprise user display information means for recording in the terminal the information identifying information that has been displayed to the user via the terminal.

The user display information obtaining means may be provided on a device for providing a predetermined service to the user, and at the time of the predetermined service being provided to the user, information is obtained identifying information that has been displayed to the user via the terminal in which terminal the information is recorded.

The searching means may search information as information to be provided to the user, relating to a product or service to be provided to the user in the vicinity of a second establishment of the transportation mode at a further distance from the first establishment of the transportation mode which the user can reach with the passenger ticket.

The information searched by the searching means may include information verifying that the provider of the product or service to be provided to the user will bear the cost of the user being transported to the second establishment of the transportation mode at a further distance from the first establishment using the transportation mode.

The information searched by the searching means may include information relating to a usage method of the transportation mode.

The information searched by the searching means may include information relating to the time required for transportation by the transportation mode.

The searching means may search map information on the travel route from the passenger ticket departure point to the destination, as information to be provided to the user.

The information processing device may be configured so that when the current position obtained by the current position obtaining means is within a predetermined area surrounding a predetermined point on the travel path, a warning is output to the user via the terminal.

The information searched by the searching means may include advertising directed at the user, and the information processing device may further include: billing information generating means for generating billing information for the advertiser corresponding to the transmission of the advertisement when the advertisement is transmitted to the terminal by the transmission means.

The signal processing device and the terminal each may further include: a reference electrode for obtaining a reference point for determining the output value; and a signal electrode provided so that electrostatic coupling is stronger to the communication medium than the reference electrode; wherein communication is performed with the terminal based on the signal based on the electric potential difference occurring between the reference electrode and the signal electrode.

The communication medium may be a human body.

According to another embodiment of the present invention, an information processing method for an information processing device which transmits information to be provided to a user, to a terminal held by the user, includes the steps of: obtaining information of the terminal user current position, based on the information transmitted from the signal processing device which can communicate with the terminal of the signal processing devices connected to itself; searching of the information to be provided to the user from multiple information which can be read out by itself, based on the obtained current position information; and transmission of the searched information to the terminal.

According to another embodiment of the present invention, a computer readable program for executing information processing to an information processing device which transmits information to be provided to a user, to a terminal held by the user, includes code for the steps of: controlling the obtaining of information of the terminal user current position, based on the information transmitted from the signal processing device which can communicate with the terminal of the signal processing devices connected to itself; controlling the searching of the information to be provided to the user from multiple information which can be read out by itself, based on the obtained current position information; and controlling the transmission of the searched information to the terminal.

According to another embodiment of the present invention, a recording medium stores the program.

According to another embodiment of the present invention, an information processing device for transmitting information to be provided to a user to a terminal held by the user, includes: a current position obtaining unit for obtaining the current position of the user of the terminal, based on information transmitted from a signal processing device capable of communicating with the terminal, of a signal processing device connected to itself; a searching unit for searching the information to be provided to the user from the plurality of information that can be read out by itself, based on the current position information obtained by the current position obtaining unit; and a transmission unit for transmitting the information searched with the searching unit to the terminal.

Thus, according to embodiments of the present invention, information of the terminal user current position is obtained, based on the information transmitted from the signal processing device which can communicate with the terminal of the signal processing devices connected to itself; the information to be provided to the user from multiple information which can be read out by itself is searched, based on the obtained current position information; and the searched information is transmitted to the terminal.

Also, according to the present invention, usable information can be provided more efficiently to a mobile user.

BRIEF DESCRIPTION OF THE DRAWINGS

FIG. 3 is a diagram illustrating an example of calculation results of actual values of voltage occurring at both ends of a reception load resistor in the model shown in FIG. 1;

FIG. 23 is a diagram illustrating another example of information stored in a storage unit of the managing server;

FIG. 24 is a diagram illustrating an example of a content channel and an advertising channel;

FIG. 29 is a diagram illustrating an example of information stored in the memory of the portable device;

FIG. 35 is a diagram illustrating a configuration example of the metadata in FIG. 34;

FIG. 38 is a diagram illustrating another example of the coupon analysis information in FIG. 36;

FIG. 39 is a diagram illustrating yet another example of the coupon analysis information in FIG. 36;

FIG. 40 is a diagram illustrating yet another example of the coupon analysis information in FIG. 36; and FIG. 41 is a diagram illustrating yet another example of the coupon analysis information in FIG. 36.

DESCRIPTION OF THE PREFERRED EMBODIMENTS

Figure 1:
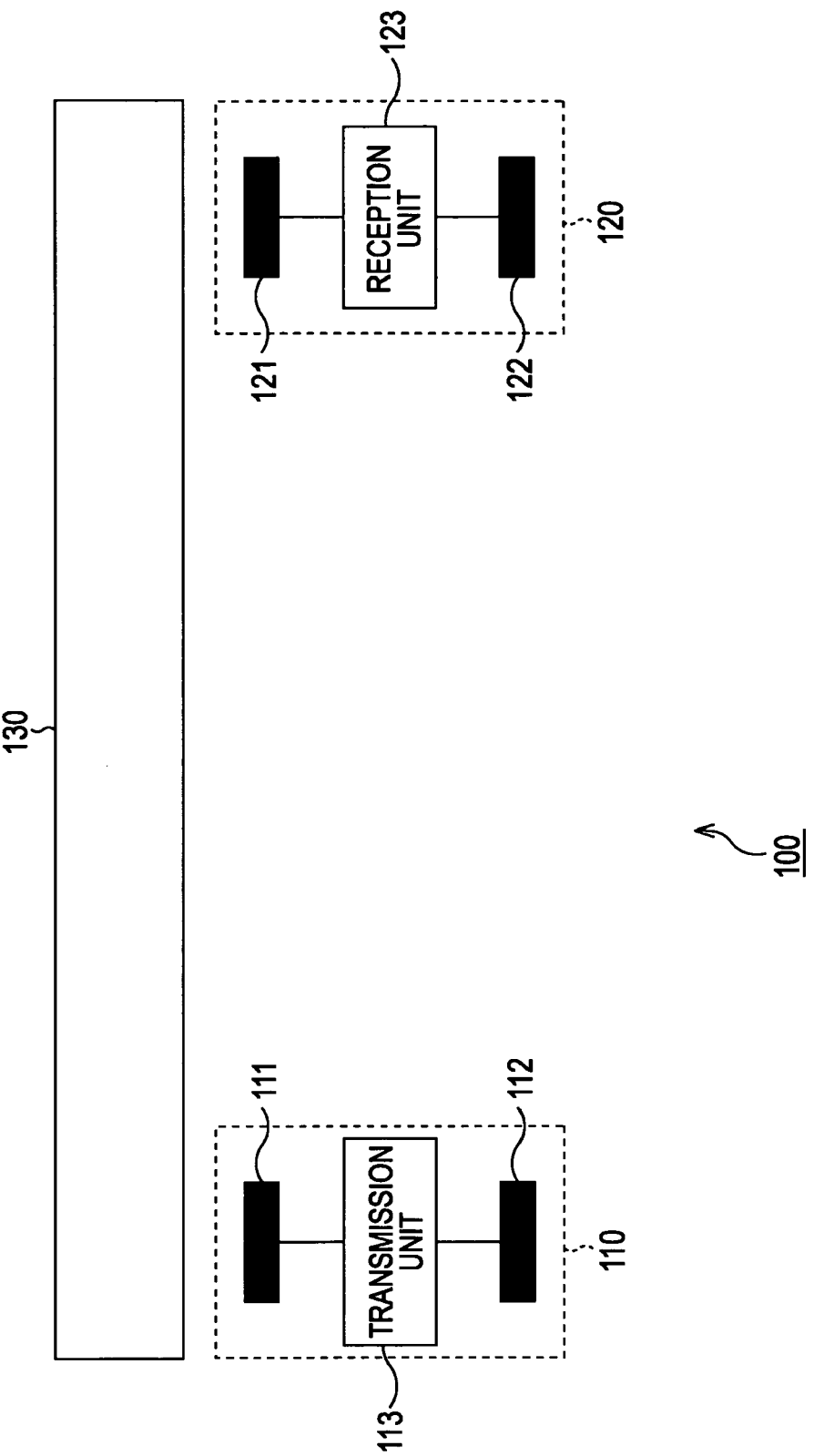
FIG. 1 is a diagram illustrating a configuration example of an embodiment of a communication system to which the present invention is applied.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily means that the element does not relate to that feature of the claims. Conversely, even if an element is described here as relating to a certain feature of the claims that does not necessary mean that the element does not relate to other features of the claims.

According to one embodiment of the present invention, an information processing device (for example, the managing server 1171 in FIG. 9) for transmitting information to be provided to a user to a terminal held by the user (for example, the portable device 1002 in FIG. 9), includes: current position obtaining means (for example, the CPU 1501 in FIG. 12 which executes the processing in step S102 in FIG. 13) for obtaining the current position information of the user of the terminal, based on information transmitted from a signal processing device capable of communicating and the terminal, of signal processing devices (for example, the transmission/reception device 1151 in FIG. 9) connected to itself; searching means (for example, the CPU 1501 in FIG. 12 which executes the processing in step S103 in FIG. 13), for searching the information to be provided to the user from the plurality of information that can be read out by itself, based on the current position information obtained by the current position obtaining means; and transmission means (for example, the CPU 1501 in FIG. 12 which executes the processing in step S104 in FIG. 13) for transmitting the information searched with the searching means to the terminal.

The information processing device may further include: information obtaining means (for example, the CPU 1501 in FIG. 12 which executes the processing in step S221 in FIG. 18) for obtaining information relating to the user destination or departure point obtained from the terminal by the signal processing device; wherein the searching means search information (for example, searches with the processing in step S222 in FIG. 18) to be provided to the user out of the plurality of information that can be read out by itself, based on information relating to a user destination or departure point obtained by the information obtaining means.

The information processing device may be configured so that the searching means search information (for example, the information illustrated in FIG. 21), as information to be provided to the user, relating to a product or service to be provided to the user in the vicinity of the establishment (for example, a train station) of the transportation mode which the user can reach with the passenger ticket.

The information processing device may be configured so that the information searched by the searching means includes information (for example, the coupon 1297 in FIG. 22) indicating that a provider of a product or service to be provided to the user provides a predetermined service to a user holding the terminal storing the information different from a service provided to a user not holding the terminal storing the information.

Figure 34:
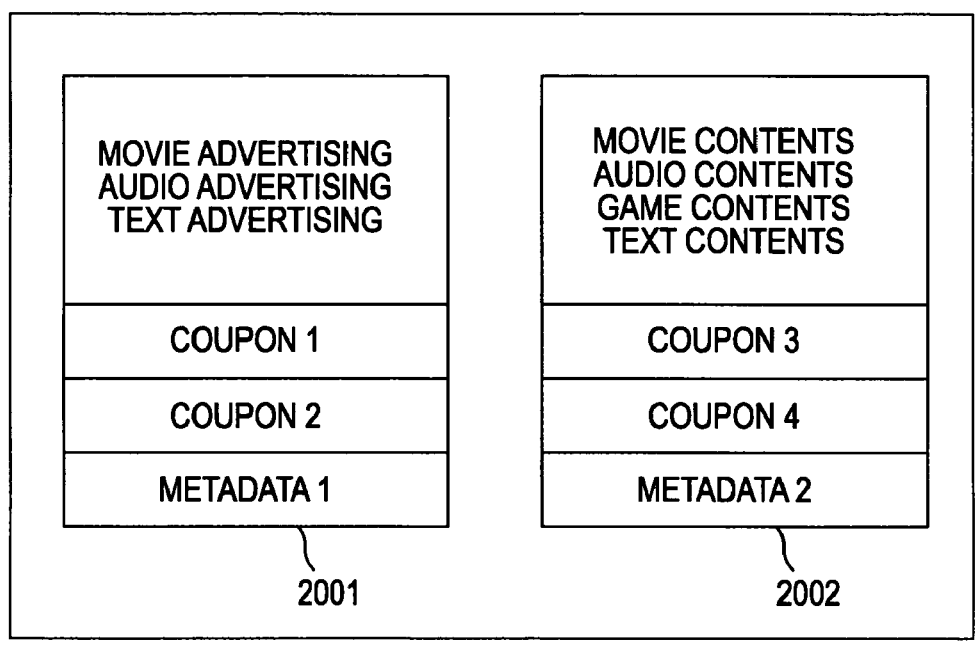
FIG. 34 is a diagram illustrating yet another example of information stored in a storage unit of the managing server.

The information processing device may be configured so that the information indicating that the predetermined service is to be provided is transmitted as an attachment (for example, attached as illustrated in FIG. 34) to the content data transmitted to the terminal.

Figures 36, 37:
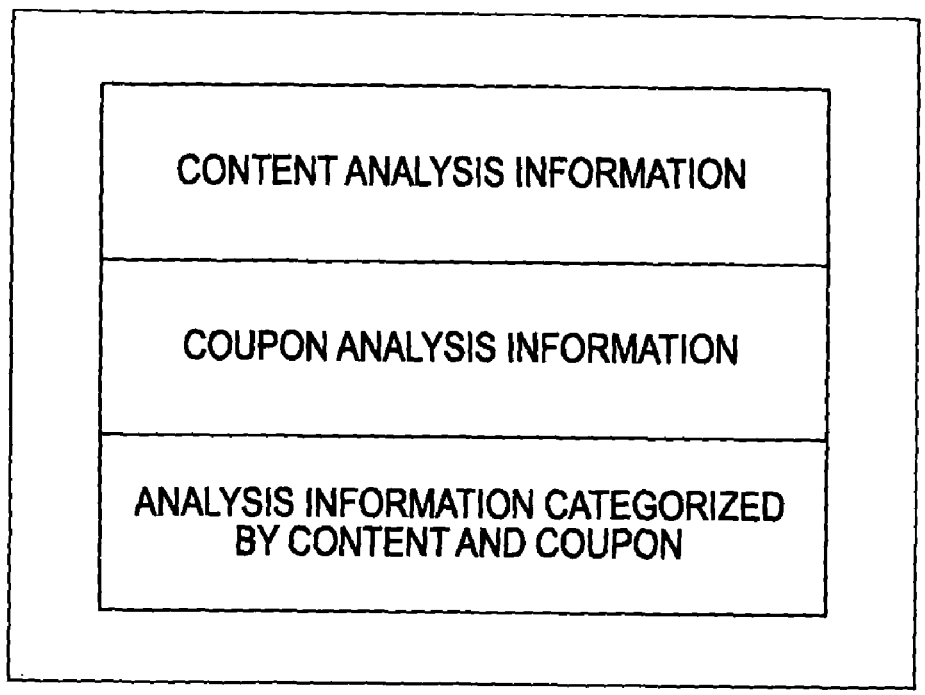
FIG. 36 is a diagram illustrating another example of information stored in the memory of the portable device.
FIG. 37 is a diagram illustrating an example of the coupon analysis information in FIG. 36.

The information processing device may be configured so that when the information indicating that the predetermined service is to be provided is displayed to the provider of the product or service, the terminal stores the information showing that the information showing that the information indicating the predetermined service to be provided is displayed on the terminal (for example, stored as illustrated in FIG. 36); the information showing that the information indicating that the predetermined service is to be provided is obtained from the terminal; and information is generated to show the preferences of the user holding the terminal, based on the obtained information.

The information processing device may be configured so that the information selected (for example, selected with the processing in step S323 in FIG. 28) according to a predetermined reference from multiple information searched with the searching means and provided to the user is displayed to the user via the terminal.

Information may be recorded in the terminal identifying information that has been displayed to the user via the terminal, and the information processing device may further comprise user display information means (for example, the CPU 1501 in FIG. 12 which executes processing in step S361 in FIG. 32) for recording in the terminal the information identifying information that has been displayed to the user via the terminal.

The user display information obtaining means may be provided on a device (for example, the terminal 1301 in FIG. 30) for providing a predetermined service to the user, and at the time of the predetermined service being provided to the user, information is obtained identifying information that has been displayed to the user via the terminal in which terminal the information is recorded.

The information processing device may be configured so that the searching means search information (for example, information illustrated in FIG. 21) as information to be provided to the user, relating to a product or service to be provided to the user in the vicinity of a second establishment (for example, DD station in FIG. 22) of the transportation mode at a further distance from the first establishment (for example, CC station in FIG. 22) of the transportation mode which the user can reach with the passenger ticket.

The information processing device may be configured so that the information searched by the searching means includes information (for example, the coupon 1297 in FIG. 22) verifying that the provider of the product or service to be provided to the user will bear the cost of the user being transported to the second establishment of the transportation mode at a further distance from the first establishment (for example, a train station) using the transportation mode.

The information processing device may be configured so that the information searched by the searching means includes information relating to a usage method (for example, connection guides or exit guides) of the transportation mode.

The information processing device may be configured so that when the current position obtained by the current position obtaining means is within a predetermined area surrounding a predetermined point (for example, a branching point or near a connection train station) on the travel path, a warning (for example, a display, audio, vibration and so forth) is output to the user via the terminal.

The information processing device may be configured so that the information searched by the searching means includes advertising directed at the user, and further includes: billing information generating means (for example, the CPU 1501 in FIG. 12 which executes the processing in step 224 in FIG. 18) for generating billing information for the advertiser corresponding to the transmission of the advertisement when the advertisement is transmitted to the terminal by the transmission means.

The information processing device may be configured so that the signal processing device and the terminal each further includes: a reference electrode (for example, the reference electrode 1102 in FIG. 11 or the reference electrode 1202 in FIG. 12) for obtaining a reference point for determining the output value; and a signal electrode (for example, the signal electrode 1101 in FIG. 11 or the signal electrode 1201 in FIG. 12) provided so that electrostatic coupling is stronger to the communication medium than the reference electrode; wherein communication is performed with the terminal based on the signal based on the electric potential difference occurring between the reference electrode and the signal electrode.

According to another embodiment of the present invention, an information processing method for an information processing device (for example, the managing server 1171 in FIG. 9) which transmits information to be provided to a user, to a terminal (for example, the portable device 1002 in FIG. 9) held by the user, includes the steps of: obtaining information (for example, the processing in step S102 in FIG. 13) of the terminal user current position, based on the information transmitted from the signal processing device which can communicate with the terminal of the signal processing devices (for example, the transmission/reception device 1151 in FIG. 9) connected to itself; searching (for example, the processing in step S103 in FIG. 13) of the information to be provided to the user from multiple information which can be read out by itself, based on the obtained current position information; and transmission (for example, the processing in step S104 in FIG. 13) of the searched information to the terminal.

The embodiments of the present invention will be described below with reference to the diagrams. First, the wireless communication to be used with the present invention will be described in detail with reference to FIGS. 1 through 8.

FIG. 1 is a diagram illustrating a configuration example of an embodiment of a communication system to which the present invention is applied.

In FIG. 1, a communication system 100 is configured including a transmission device 110, a reception device 120, and a communication medium 130, thereby realizing a transmission/reception system wherein the transmission device 110 and the reception device 120 exchange signal via the communication medium 130. In other words, with this communication system 100, signals transmitted from the transmission device 110 are transmitted via the communication medium 130, and received by the reception device 120.

The transmission device 110 includes a transmission signal electrode 111, a transmission reference electrode 112, and a transmission unit 113. The transmission signal electrode 111 is an electrode for transmission of signals to be transferred via the communication medium 130, and is provided such that the electrostatic coupling thereof as to the communication medium 130 is stronger than that of the transmission reference electrode 112, which is for obtaining a reference point for the purpose of determining the vertical difference in the signals. The transmission unit 113 is provided between the transmission signal electrode 111 and the transmission reference electrode 112, and provides these electrodes with electric signals (electric potential) to be transferred to the reception device 120.

The reception device 120 includes a reception signal electrode 121, a reception reference electrode 122, and a reception unit 123. The reception signal electrode 121 is an electrode for reception of signals to be transferred via the communication medium 130, and is provided such that the electrostatic coupling thereof as to the communication medium 130 is stronger than that of the reception reference electrode 122, which is for obtaining a reference point for the purpose of determining the vertical difference in the signals. The reception unit 123 is provided between the reception signal electrode 121 and the reception reference electrode 122, and converts electric signals (electric potential) generated between these electrodes into suitable electric signals, and restores the electric signals generated at the transmission unit 113 of the transmission device 110.

The communication medium 130 is configured of a material having physical properties enabling electric signals to be carried, such as electric conductors, dielectric materials, for example. For example, the communication medium 130 may be configured of: an electric conductor, a representative example of which is metal, such as copper, iron, aluminum, or the like. As another example, the communication medium 130 may be configured of a dielectric material such as pure water, rubber, glass, or the like; or a compound, such as a living body or the like, or an electrolytic solution of saltwater or the like. The shape of the communication medium 130 is not restricted in any way, and may be, for example, linear, plate-shaped, spherical, a polygonal pillar, a cylinder, or any other arbitrary shape.

With regard to such a communication system 100, description will first be made regarding the relation between the electrodes and the space around the communication medium or device. In the following description, the communication 130 will be described as being a perfect conductor, for the sake of facilitating description. Also, we sill say that there is space between the transmission signal electrode 111 and the communication medium 130, and between the reception signal electrode 121 and the communication medium 130, and that there is no electrical coupling in this space. That is to say, capacitance is formed between the communication medium 130 and each of the transmission signal electrode 111 and the reception signal electrode 121.

Further, the transmission reference electrode 112 is disposed facing the space around the transmission device 110, and the reception reference electrode 122 is disposed facing the space around the reception device 120. Generally, in the event that a conductor exists in a space, capacitance is formed in the space in the vicinity of the surface of the conductor. For example, with a conductor shaped as a sphere having a radius of r meters, the capacitance C is obtained as in the following Expression (1)

Expression (1)

$$C = 4 \times \pi \times \in \times r \quad (1)$$

wherein π is the circle ratio. Also, ∈ represents permittivity of the medium surrounding the conductor, and is obtained by Expression (2)

$$\in = \in_r \times \in_0 \quad (2)$$

wherein $\in_0$ represents permittivity in a vacuum, which is $8.854 \times 10^{-12}$ F/m, and $\in_r$ represents relative permittivity as to the permittivity $\in_0$ in a vacuum.

As can be seen from Expression (1), the greater the radius r is, the greater the capacitance C is. Now, with conductors having complex shapes instead of a spherical shape, the capacitance C cannot be expressed in a simple form as with the above Expression (1), still, it can be clearly understood that the capacitance C changes according to the size of the surface area of the conductor.

As described above, the transmission reference electrode 112 forms a capacitance as to the space around the transmission device 110, and the reception reference electrode 122 forms a capacitance as to the space around the reception device 120. That is to say, when viewed from an external virtual infinite distance from the transmission device 110 and the reception device 120, the potential of the transmission reference electrode 112 and the reception reference electrode 122 is fixed, and becomes less readily changeable.

Next, the principle of mechanism of the communication with the communication system 100 will be described. Note that in the following description, a capacitor may be referred to simply as capacitance for the sake of facilitating description, or due to the order in which description is made, but these should be understood to be equivalent.

Also, the following description is made with the understanding that the transmission device 110 and the reception device 120 in FIG. 1 are disposed with sufficient distance maintained between the two devices, and that mutual effects are negligible. Also, let us say that at the transmission device 110, the transmission signal electrode 111 forms electrostatic coupling only with the communication medium 130, with sufficient distance between the transmission reference electrode 112 and the transmission signal electrode 111, so that mutual effect is negligible (e.g., there is no electrostatic coupling). Similarly, let us say that at the reception device 120, the reception signal electrode 121 forms electrostatic coupling only with the communication medium 130, with sufficient distance between the reception reference electrode 122 and the reception signal electrode 121, so that mutual effect is negligible (e.g., there is no electrostatic coupling). Of course, the very fact that that the transmission signal electrode 111, reception signal electrode 121, and the communication medium 130 are disposed in a space means that each has capacitance as to the space in reality, but these will be considered negligible for the sake of facilitating description.

Figure 2:
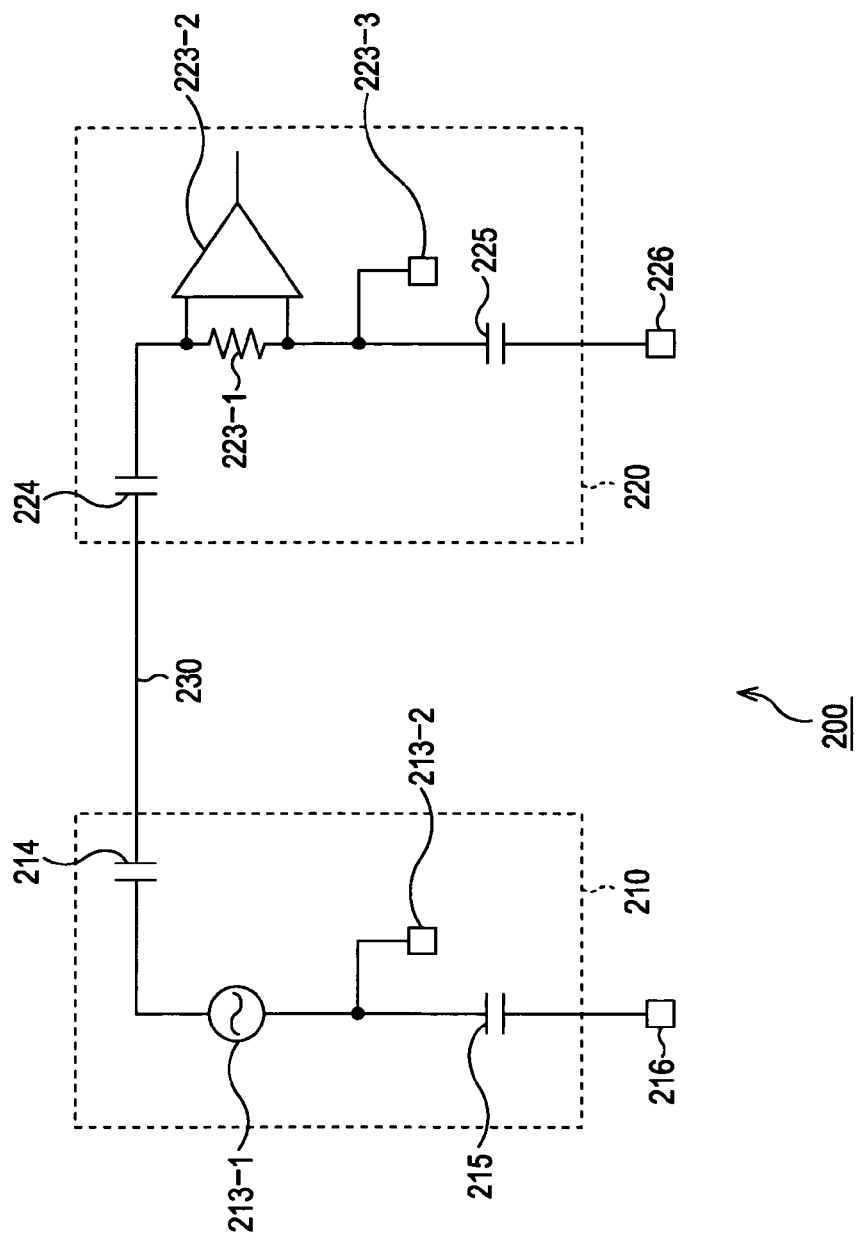
FIG. 2 is a diagram illustrating an equivalent circuit of the communication system shown in FIG. 1 in an ideal state.

FIG. 2 is a diagram illustrating the communication system 100 shown in FIG. 1 with an equivalent circuit. The communication system 200 is the communication system 100 represented with an equivalent circuit, and is substantially equivalent to the communication system 100.

That is to say, while the communication system 200 has a transmission device 210, reception device 220, and connection line 230, the transmission device 210 corresponds to the transmission device 110 of the communication system 100 shown in FIG. 1, the reception device 220 corresponds to the reception device 120 of the communication system 100 shown in FIG. 1, and the connection line 230 corresponds to the communication medium 130 of the communication system 100 shown in FIG. 1.

At the transmission device 210 shown in FIG. 2, the signal source 213-1 and the grounding point 213-2 correspond to the transmission unit 113 shown in FIG. 1. The signal source 213-1 generates sine waves of a specific cycle ω×t rad as transmission signals, wherein t (seconds) represents time, and ω rad/s represents angular frequency which can be represented as in Expression (3)

Expression (3)

$$\omega = 2 \times \pi \times f \quad (3)$$

wherein π represents the circle ratio and f Hz represents the frequency of signals generated by the signal source 213-1. The grounding point 213-2 is the point where the circuit within the transmission device 210 is grounded. That is to say, one terminal of the signal source 213-1 is set to a predetermined reference potential of the circuit within the transmission device 210.

Cte 214 denotes a capacitor, representing the capacitance between the transmission signal electrode 111 and the communication medium 130. That is to say, Cte 214 is provided between the terminal of the signal source 213-1 at the opposite side from the grounding point 213-2, and the connection line 230. Also, Ctg 215 denotes a capacitor, representing the capacitance as to the space of the transmission reference electrode 112 shown in FIG. 1. Ctg 215 is provided between the terminal of the signal source 213-1 at the side of the grounding 213-2 and a grounding point 216 representing a spatial point of infinity (virtual point) based on the transmission device 210.

In the reception device 220 shown in FIG. 2, a Rr 223-1, detector 223-2, and grounding point 223-3 correspond to the reception unit 123 shown in FIG. 1. The Rr 223-1 is a load resistor (reception resistor) for extracting reception signals. The detector 223-2, which is configured of an amplifier, detects and amplifies potential difference between the terminals at both sides of the Rr 223-1. The grounding point 223-3 is a point at which the circuit within the reception device 220 is grounded. That is to say, one terminal of the Rr 223-1 (one input terminal of the detector 223-2) is set to a predetermined reference potential of the circuit within the reception device 220.

The detector 223-2 may be provided with other functions as well, such as demodulating the detected modulation signals, decoding encoded information included in the detected signals, and so forth, for example.

Cre 224 denotes a capacitor, representing the capacitance between the reception signal electrode 121 and the communication medium 130 shown in FIG. 1. That is to say, the Cre 224 is provided between the terminal of the Rr 223-1 opposite to the grounding point 223-3 and the connection line 230. Also, Crg 225 is a capacitor, representing the capacitance of the reception reference electrode 112 shown in FIG. 1 as to the space. The Crg 225 is provided between the terminal of the Rr 223-1 at the side of the grounding point 223-3 and a grounding point 226 representing a spatial point of infinity (virtual point) based on the reception device 220.

The connection line 230 represents the communication medium 130, which is a perfect conductor. Note that in the communication system 200 shown in FIG. 2, the Ctg 215 and Crg 225 are represented as being electrically connected via the grounding point 216 and the grounding point 226, as an equivalent circuit, but these actually do not need to be electrically connected; formation of capacitance in the space around the transmission device 210 or reception device 220 is sufficient. In other words, the grounding point 216 and the grounding point 226 do not need to be electrically connected, and may be mutually independent.

If there is a conductor, capacitance proportional to the size of the surface area is necessarily formed as to the surrounding space. In other words, the transmission device 210 and the reception device 220 can be far apart any distance. For example, in the event that the communication medium 130 shown in FIG. 1 is a perfect conductor, the conductivity of the connecting line 230 can be considered to be infinite, so there is no effect of the length of the connection line 230 on communications. Note further that in the event that the communication medium 130 is a conductor with sufficient conductivity, the distance between the transmission device and the reception device does not affect the stability of communication.

In the communication system 200, the signal source 213-1, Rr 223-1, Cte 214, Ctg 215, Cre 224, and Crg 225 form a circuit. The combined capacity Cx of the four serially-connected capacitors (Cte 214, Ctg 215, Cre 224, and Crg 225) can be expressed as in the following Expression (4).

Expression (4)

$$C_x = \frac{1}{\frac{1}{Cte} + \frac{1}{Ctg} + \frac{1}{Cre} + \frac{1}{Crg}} \ [F] \quad (4)$$

Also, the sine wave vt (t) which the signal source 213-1 generates is represented as shown in Expression 5.

Expression (5)

$$V_t(t) = V_m \times \sin(\omega t + \theta)[V] \quad (5)$$

Now, Vm, of which the unit is V, represents the peak voltage, and θ, of which the increment is rad, represents the initial phase angle. In other words, the actual value Vtrms of the voltage from the signal source 213-1 can be obtained from the following Expression (6).

Expression (6)

$$V_{trms} = \frac{V_m}{\sqrt{2}} \ [V] \quad (6)$$

The combined impedance Z of the entire circuit can be obtained from the following Expression (7).
Expression (7)
That is to say, the actual value Vrrms of the voltage $$Z = \sqrt{Rr^2 + \frac{1}{(\omega C_x)^2}} \quad (7)$$

$$= \sqrt{Rr^2 + \frac{1}{(2\pi f C_x)^2}} \ [\Omega]$$

generated at both ends of the Rr 223-1 can be obtained from the following Expression (8).

Expression (8)

$$V_{rrms} = \frac{Rr}{Z} \times V_{trms} \quad (8)$$

$$= \frac{Rr}{\sqrt{Rr^2 + \frac{1}{(2\pi f C_x)^2}}} \times V_{trms} \ [V]$$

Accordingly, as can be seen from Expression (8), the greater the resistance value of the Rr 223-1 is, and the greater the capacitance Cx is and the higher the frequency f, of which the unit is Hz, is, the smaller the term $1/((2\times\pi\times f\times Cx)2)$ is, and greater signals can be generated at both ends of Rr 223-1.

For example, the Table 250 shown in FIG. 3 illustrates the calculation results of the actual values Vrrms of the voltage generated at both ends of Rr 223-1, with the actual value Vtrms of the voltage of the signal source 213-1 of the transmission device 210 fixed to 2 V, for signals generated by the signal source 213-1 at frequencies of 1 MHz, 10 MHz, and 100 MHz, resistance values of Rr 223-1 of 10 KΩ, 100 KΩ, and 1 MΩ, and total circuit capacitance Cx of 0.1 pF, 1 pF, and 10 pF.

As can be seen from the Table 250, the calculation results of the actual value Vrrms are such that, in the event that other conditions are the same, the actual value Vrrms is greater for frequency f of 10 MHz than 1 MHz, greater for 10 KΩ for the resistance value of the Rr 223-1 than 1 MΩ, and greater for 10 pF in capacitance Cx than 0.1 pF. That is to say, the greater the frequency f value, Rr 223-1 resistance value, and capacitance Cx value are, the greater the actual value Vrrms of the voltage is.

Also, it can be understood from Table 250 that electric signals are generated at the Rr 223-1 even with capacitance less than 1 picofarad. That is to say, even in the event that the signal level of the signal being transferred is minute, communication can be enabled by amplifying the detected signal using the detector 223-2 of the reception device 220.

From the above results, the exchange of signals from transmission device to reception device can be made by using capacitance which is space, as a basic principle.

The capacitance as to the space of a transmission reference electrode or reception reference electrode as described above can be formed if there is space at each electrode position. Accordingly, if the transmission signal electrode and the reception signal electrode are coupled with a communication medium, the above-described transmission device and reception device can obtain communication stability without relying on distance from one another.

Next, the influence on communication based on the amount of distance between the transmission device and the reception device will be described. As described above, according to the principle of the present invention, if sufficient capacitance is formed in the space between the transmission reference electrode and the reception reference electrode, a path using the earth in the vicinity of the transmission/reception devices, or other electrical paths are not necessary, and the distance between the transmission signal electrode and reception signal electrode is not relied upon. Accordingly, for example, as with the communication system 700 shown in FIG. 4, the transmission device 710 and the reception device 720 are placed at a great distance from one another, and communication can be made by the communication medium 730 with sufficient conductivity or dielectricity electrostatically coupling with the transmission signal electrode 711 and reception signal electrode 721. At this time, the transmission reference electrode 712 electrostatically couples with the space on the exterior of the transmission device 710, and the reception reference electrode 722 electrostatically couples with the space on the exterior of the reception device 720. Accordingly, the transmission reference electrode 712 and the reception reference electrode 722 do not need to electrostatically couple with one another. However, capacitance as to the space increases as the communication medium 730 becomes longer or larger, and therefore this should be taken into consideration when determining the various parameters.

Figure 4:
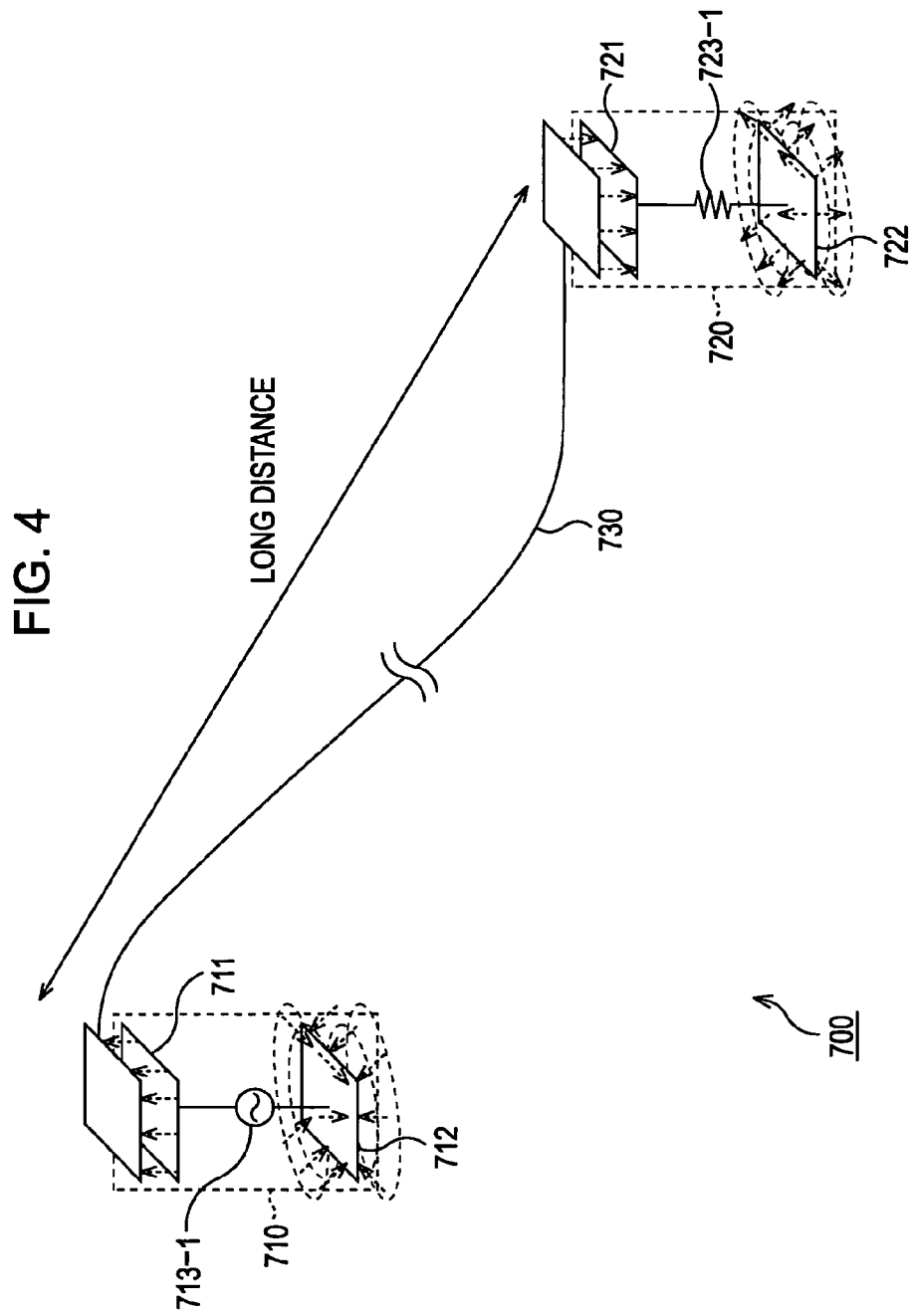
FIG. 4 is a diagram illustrating a layout example of the communication system shown in FIG. 1.

The communication system 700 shown in FIG. 4 is a system corresponding to the communication system 100 shown in FIG. 1, wherein the transmission device 710 corresponds to the transmission device 110, the reception device 720 corresponds to the reception device 120, and the communication medium 730 corresponds to the communication medium 130.

With the transmission device 710, the transmission signal electrode 711, the transmission reference electrode 712, and the signal source 713-1 each correspond to the transmission signal electrode 111, the transmission reference electrode 112, and the transmission unit 113 (or a part thereof). Similarly, with the reception device 720, the reception signal electrode 721, the reception reference electrode 722, and the Rr723-1 each correspond to the reception signal electrode 121, the reception reference electrode 122, and the reception unit 123 (or a part thereof).

Accordingly, the description for these parts will be omitted.

As described above, the communication system 700 to which present invention has been applied does not need a physical reference point path, and communication can be realized with a communication signal transfer path alone.

While description has been made above that the transmission signal electrode and reception signal electrode are not in contact with the communication medium, arrangements may be made not restricted to this, and the transmission signal electrode and reception signal electrode may be connected with a communication medium having conductivity, as long as sufficient capacitance can be obtained between the transmission reference electrode and reception reference electrode with the space around the respective devices.

Figure 5:
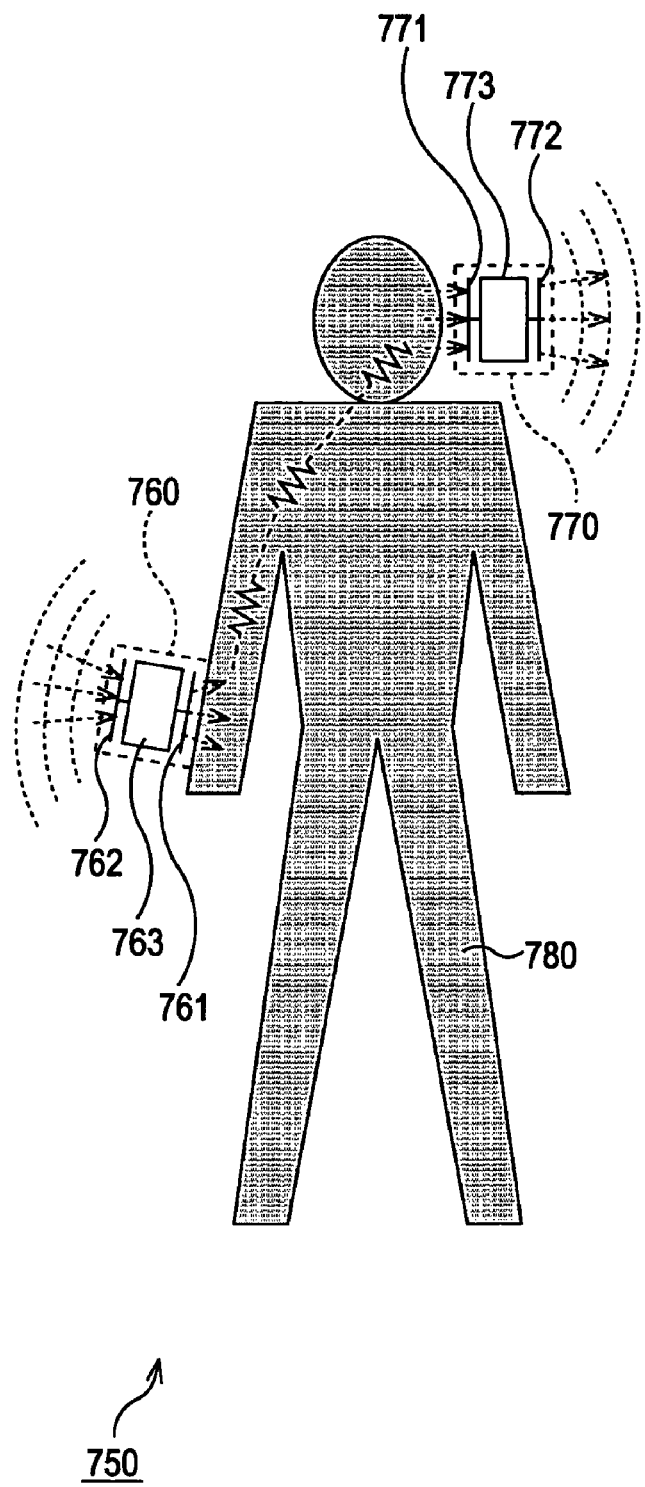
FIG. 5 is a diagram illustrating an actual usage example of an embodiment of a communication system to which the present invention is applied.

Next, a specific application example of the above communication system will be described. For example, the communication such as described above can use a living body as the communication medium. FIG. 5 is a schematic diagram illustrating an example of a communication system in a case of performing communication via a human body. In FIG. 5, the communication system 750 is a system wherein music data is transmitted from a transmission device 760 attached to an arm of a human body, and the music data is received by a reception device 770 attached to the head of the human body and converted into audio, so as to be output for the user to listen to. This communication system 750 is a system corresponding to the above-described communication systems (e.g., communication system 100), and the transmission device 760 and reception device 770 correspond to the transmission device 110 and reception device 120, respectively. Also, in the communication system 750, the human body 780 is the communication medium, corresponding to the communication medium 130 in FIG. 1.

That is to say, the transmission device 760 has a transmission signal electrode 761, transmission reference electrode 762, and transmission unit 763, each corresponding to the transmission signal electrode 111, transmission reference electrode 112, and transmission unit 113, shown in FIG. 1. Also, the reception device 770 has a reception signal electrode 771, reception reference electrode 772, and reception unit 773, each corresponding to the reception signal electrode 121, reception reference electrode 122, and reception unit 123, shown in FIG. 1.

Accordingly, the transmission device 760 and reception device 770 are disposed such that the transmission signal electrode 761 and the reception signal electrode 771 are in contact with or close to the human body 780 which is the communication medium. That transmission reference electrode 762 and the reception reference electrode 772 only have to have capacitance as to space, so coupling with earth nearby and coupling between the transmission and reception devices (or electrodes) is unnecessary.

Figure 6:
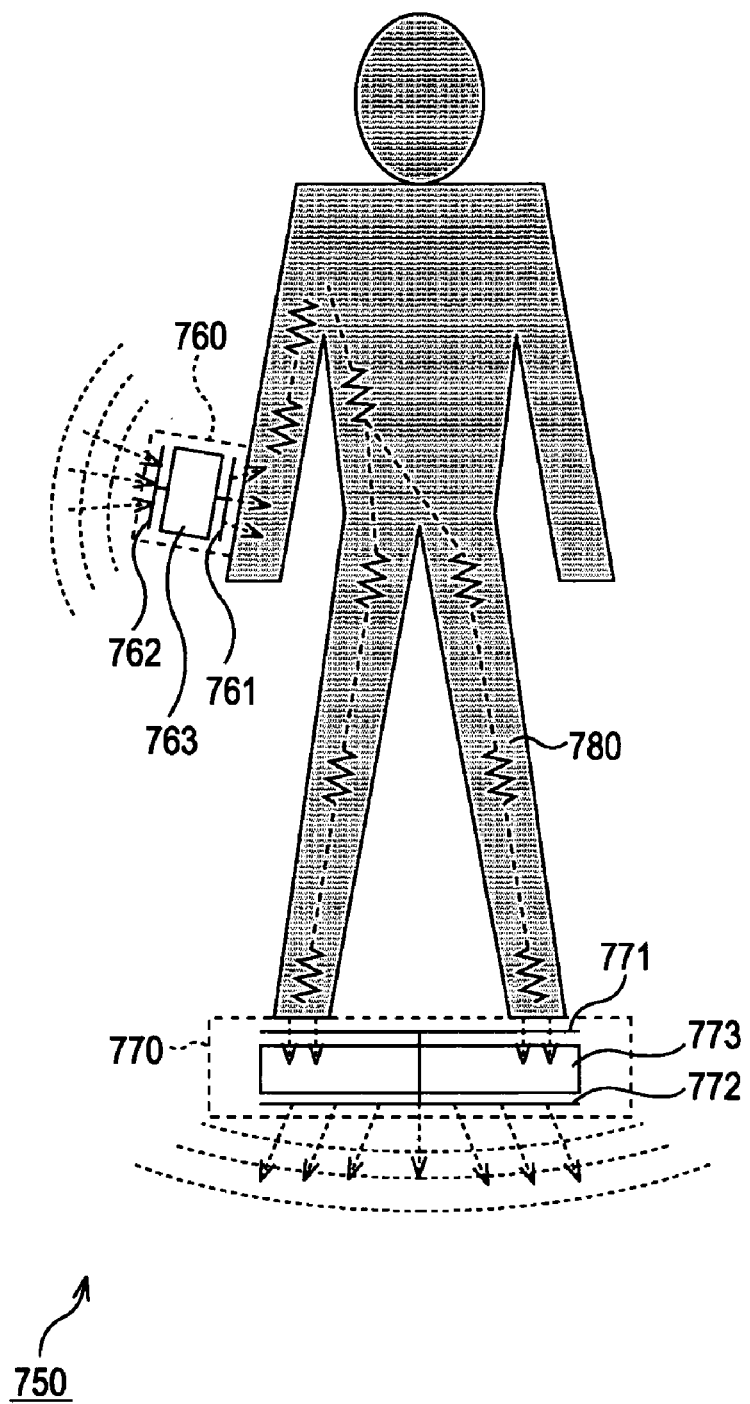
FIG. 6 is a diagram illustrating another usage example of an embodiment of a communication system to which the present invention is applied.

FIG. 6 is a diagram for describing another example for realizing the communication system 750. In FIG. 6, the reception device 770 is in contact with (or close to) the bottom of the feet of the human body 780, and communication is performed with the transmission device 760 attached to an arm of the human body 780. In this case as well, the transmission signal electrode 761 and the reception signal electrode 771 are disposed so as to be in contact with (or close to) the human body 780 serving as a communication medium, and the transmission reference electrode 762 and the reception reference electrode 772 are provided facing space. This is in particular an application example which would be impossible to realize with techniques used heretofore which use the earth as a communication path.

Thus, according to the present invention, by using a human body and so forth as a communication medium, wireless communication can be performed without providing wired setups such as cables.

With such a communication system, there is no particular restriction on the modulation method for signals to be sent over the communication medium as long as both the transmission device and the reception device can handle it, so an optimal method can be selected based on the overall system properties of the communication system. Specific examples of modulation methods include analog signals subjected to base band, amplitude modulation, or frequency modulation, or digital signals subjected to base band, amplitude modulation, frequency modulation, or phase modulation, and any one of these, or a combination of a plurality thereof, may be used.

Further, an arrangement may be made with such a communication system wherein one communication medium is used to establish multiple communications, with full-duplex communication or communication between multiple communication devices of a single communication medium, or the like, being realized.

Examples of methods for realizing such multiplex communication will be described. A first is to apply spread spectrum technology. In this case, frequency bandwidth and a predetermined time-sequence code are determined between the transmission device and the reception device. The transmission device changes the original signal with regard to frequency according to the time-sequence code within this frequency bandwidth, and spreads the signals over the entire frequency band before transmitting. The reception device receives the spread components, and then integrates the received signals so as to decode the received signals.

The advantages of frequency spreading will be described. According to the Shannon-Hartley channel capacity theorem, the following Expression holds.

Expression (9)

$$C = B \times \log_2\left(1 + \frac{S}{N}\right) \text{ [bps]} \quad (9)$$

wherein C, of which the increment is bps, represents channel capacity, representing the theoretically greatest data rate which can be sent over the communication path. B, of which the increment is Hz, represents the channel bandwidth, and S/N represents the signal/noise electric power ratio (SN ratio). A Maclaurin expansion of the above Expression for a low S/N ration allows the above Expression (9) to be approximated as in the following Expression (10).

Expression (10)

$$C \approx \frac{S}{N} \times B \text{ [bps]} \quad (10)$$

Accordingly, if we say that the S/N ratio is at a level of the noise floor or lower, S/N<<1 holds, but the channel capacity C can be raised to a desired level by widening the channel bandwidth B.

Setting a different time-sequence code for each communication path, and differentiating the behavior of frequency spreading, allows frequency spreading without mutual interference, and crosstalk is eliminated, so multiple communications can be held simultaneously.

A second is to determined frequency bandwidths between a transmission device and reception device, and further divide this into multiple regions, thereby applying frequency division. In this case, the transmission device (or reception device) either follows certain rules for frequency allocation, or detects frequency bands that are available when starting communication and allocates frequency bands based on the detection results.

That is to say, by using frequency bands differing for each communication path, crosstalk is suppressed and multiple communications can be performed over a single communication medium, simultaneously. Also, using frequency division means that many-to-one communication and many-to-many communication can be performed.

A third is a method applying time division, wherein communication time between the transmission device and reception device is divided into multiple times. In this case, the transmission device (or reception device) either follows certain rules for time division, or detects time regions that are available when starting communication and performs communication time division based on the detection results.

That is to say, by using time regions differing for each communication path, crosstalk is suppressed and multiple communications can be performed over a single communication medium. Also, using time division means that many-to-one communication and many-to-many communication can be performed.

Further, as a method other than the above-described, two or more of the first through third communication methods may be combined.

The fact that the transmission device and reception device can perform simultaneous communication with multiple other devices is particularly important with particular applications. For example, assuming application to tickets for mass transit systems, various handy applications can be made, such as at the time of a user having both a device A holding information of a pass and a device B having an electronic money function passing through an automatic wicket, communication can be simultaneously made with both device A and device B by using a method such as described above, so in the event that the route which the user has used includes a section other than that covered by the pass of the user, the difference in fee can be deducted from the electronic money in the device B.

Figure 7:
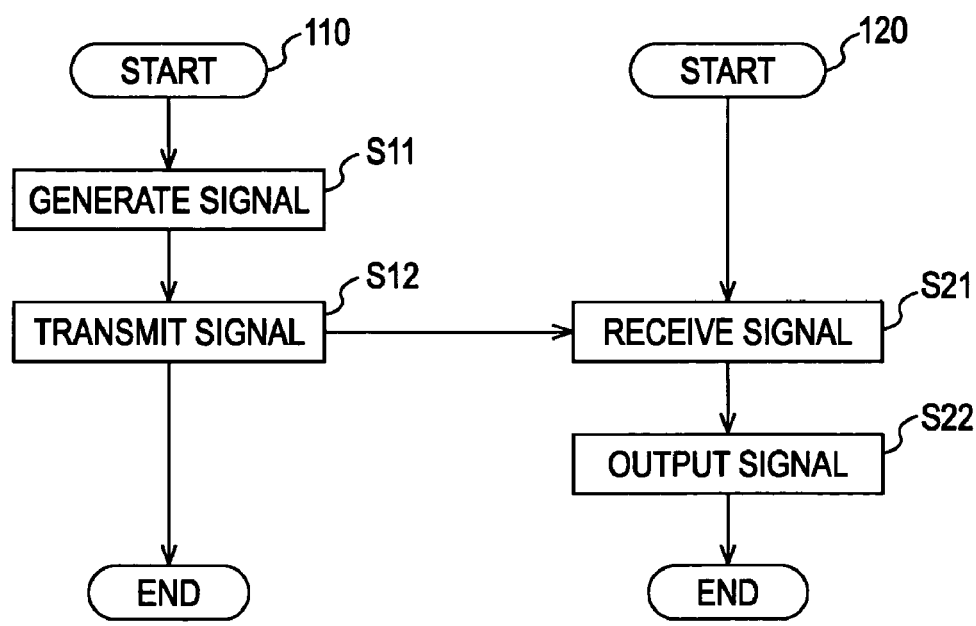
FIG. 7 is a flowchart illustrating an example of the flow of communication processing.

The flow of communication processing executed in the communication between the transmission device and reception device such as described above will be described with reference to the flowchart shown in FIG. 7, by way of an example of the transmission device 110 and reception device 120 of the communication system 100 shown in FIG. 1.

In step S11, the transmission device 113 of the transmission device 110 generates a signal to be transmitted, in step S12, the generated signal is transmitted onto communication medium 130 via the transmission signal electrode 111. The transmission unit 113 of the transmission device transmitting the signal ends communication processing. The signal transmitted from the transmission device 110 is supplied to the reception device via the communication medium 130. The reception unit of the reception device 120 receives the signal via the reception signal electrode 121 in step S21, and in step s22 outputs the received signal. The reception unit 123 which output the received signal ends the communication processing.

As described above, the transmission device 110 and the reception device 120 do not need to have complicated processing, and can perform basic communications via the communication medium 130 with simple processing. In other words, the transmission device 110 and the reception device 120 do not need to have a closed circuit configured using reference electrodes, and stable communication processing can be easily performed without being affected by the environment, simply by exchanging signals via the signal electrodes. Thus the transmission device 110 and the reception device 120 (communication system 100) reduces the communication processing burden for performing stable communication without being affected by the environment, and can also thereby reduce manufacturing costs. Note that by simplifying the structure of communication processing, the communication system 100 can be easily used along with a wide variety of communication methods, such as modulation, encoding, encryption, multiplexing, and so forth.

Now, while description has been made in the above communication system that the transmission device and the reception device are configured as separate entities, other arrangements may be made, and the communication system may be configured using a transmission/reception device having both functions of the transmission device and the reception device.

Figure 8:
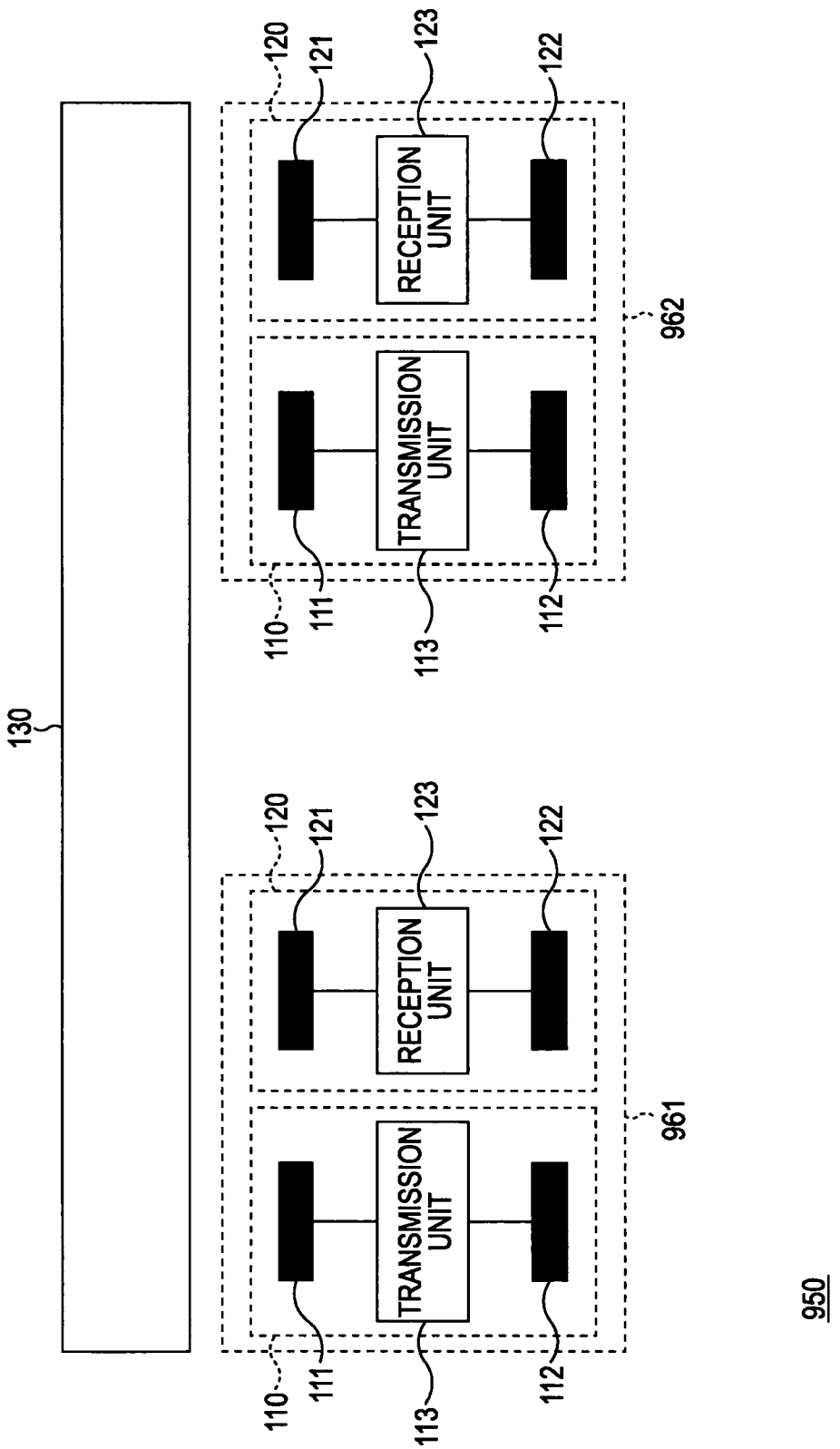
FIG. 8 is a diagram illustrating yet another configuration example of a communication system to which the present invention is applied.

FIG. 8 is a diagram illustrating another configuration example of the communication system to which the present invention is applied.

In FIG. 8, the communication system 950 has a transmission/reception device 961, a transmission/reception device 962, and a communication medium 130. the communication system 950 is a system wherein the transmission/reception device 961 and the transmission/reception device 962 bi-directionally exchange signals via the communication medium 130.

The transmission/reception device 961 has the configuration of both a transmission unit 110 the same as the transmission device 110 in FIG. 1, and a reception unit 120 the same as the reception device 120 in FIG. 1. That is to say, the transmission/reception device 961 has a transmission signal electrode 111, transmission reference electrode 112, transmission unit 113, reception signal electrode 121, reception reference electrode 122, and reception unit 123.

That is to say, the transmission/reception device 961 transmits signals over the communication medium 130 using the transmission unit 110, and receives signals supplied thereto via the communication medium 130 using the reception unit 120. At this time, the transmission/reception device 961 is configured so as to avoid crosstalk between the communication by the transmission unit 110 and the communication by the reception unit 120.

The transmission/reception device 962 has the same configuration as the transmission/reception device 961, and operates in the same way, so description thereof will be omitted. That is to say, the transmission/reception device 961 and the transmission/reception device 962 communicate bi-directionally over the communication medium 130 with the same method as each other.

Thus, the communication system 950 (transmission/reception device 961 and transmission/reception device 962) can easily realize bi-directional wireless communication without providing a wired setup such as cables.

It should be noted that in the example in FIG. 8, different electrodes are used for transmission and reception, but one pair of signal electrode and reference electrode can be provided, wherein transmission and reception are switched.

Next, the information providing system using wireless communication as described above with reference to FIGS. 1 through 8 will be described.

Figure 9:
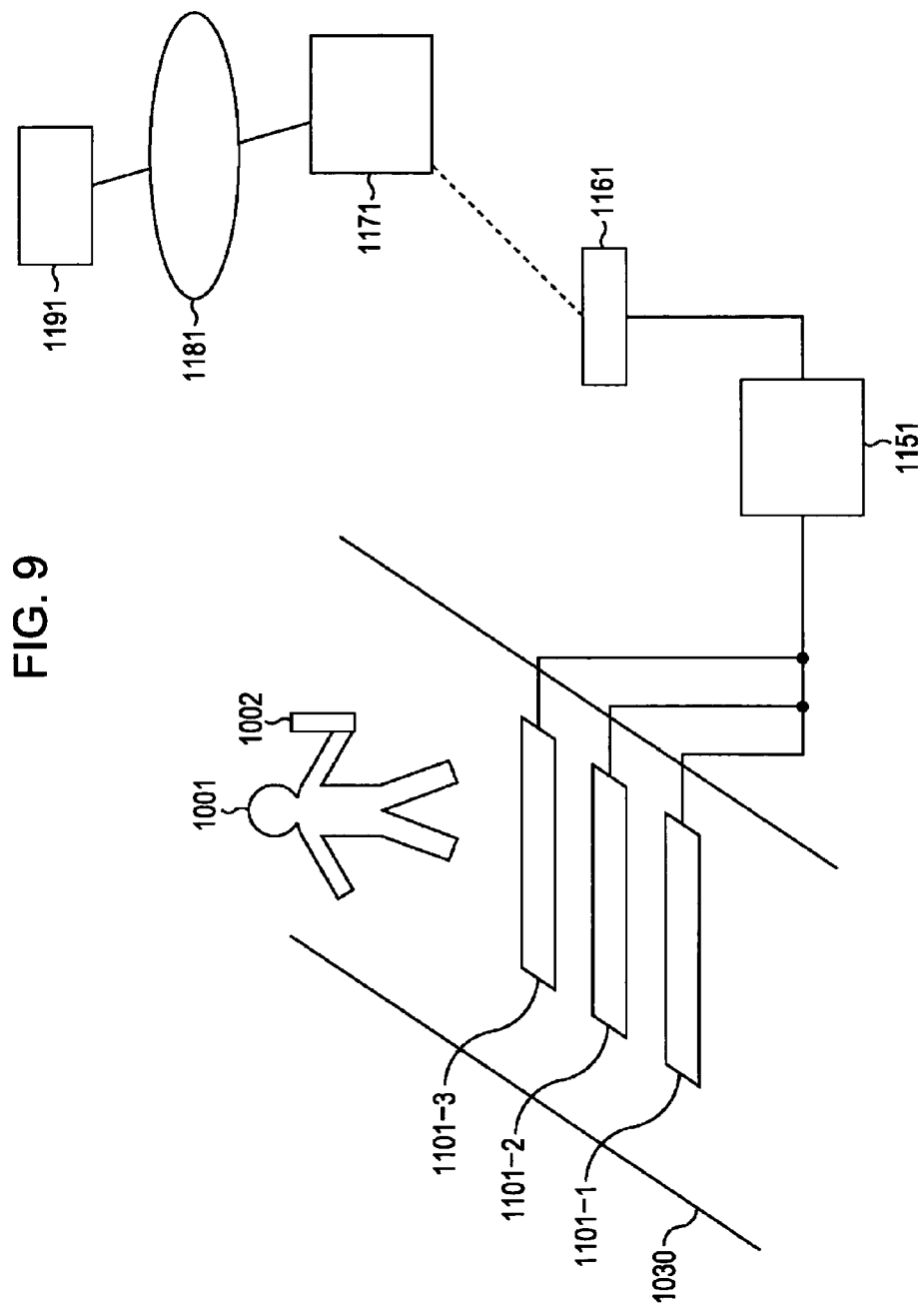
FIG. 9 is a diagram illustrating a configuration example relating to an embodiment of an information providing system using the present invention.

FIG. 9 is a diagram illustrating a configuration example relating to an embodiment of an information providing system using the present invention. This information providing system assumes that predetermined information can be provided via a portable device 1002 to a user 1001 who is a passenger riding a train and so forth and is holding a portable device 1002 capable of wireless communication as described above with reference to FIGS. 1 through 8.

With this example, the signal electrodes 1101-1 through 1101-3 are embedded under the floor 1030 of a train or train station and so forth, and for example, when the user 1001 walks above the signal electrodes 1101-1 through 1101-3, the wireless communication as described above with reference to FIGS. 1 through 8 is performed between the transmission/reception device 1151 connected to the signal electrodes 1101-1 through 1101-3 and the portable device 1002, with the human body of the user 1001 as a communication medium. Here, the signal electrodes 1101-1 through 1101-3 are shown, but in actuality, many more signal electrodes would be provided according to the location that the signal electrodes are embedded (including train cars). It should be noted that in the case wherein individually specifying the signal electrodes 1101-1 through 1101-3 is not necessary, these will be referenced simply as signal electrode 1101.

The transmission/reception device 1151 is disposed, for example, under the floor of a train or train station, and an adaptor 1161 is connected to the transmission/reception device 1151. The adaptor 1161 performs communication with the managing server 1171 of the railway company which manages the trains, train stations and so forth, by using for example a wireless or wired LAN (Local Area Network). It should be noted that the transmission/reception device 1151 is disposed in multiple trains or within multiple train stations, and in actuality there are a greater number of transmission/reception devices 1151 and adaptors 1161.

The managing server 1171 is disposed for example in an information center and so forth of a railway company, and performs transmission/reception of information between multiple transmission/reception devices, and transmits necessary information to individual transmission/reception devices. Also, the managing server 1171 is connected to a network 1181 such as the Internet, and performs communication with another server 1191 which is connected to the network 1181, and receives necessary information from the server 1191. Also, the managing server 1171 is connected to a train operating managing system, not shown, and can generate operational information about the train as necessary (for example, travel time to a predetermined train station), and provides this to the portable device 1002 via the transmission/reception device 1151.

The server 1191 is managed for example by shops or service provider companies, and transmits information in advance to the managing server 1171 via the network 1181, relating to stores, products, services, and so forth which the shops or service provider companies desire to provide to the user holding the portable device. It should be noted that in this example, only one server 1191 is shown in the diagram, but in actuality many servers 1191 are connected to the network 1181. Also, information transmitted from the servers 1191 is stored in the managing server 1171.

The transmission/reception device 1151 obtains information such as ID of the portable device 1002 which is communicable via the signal electrode 1101 and transmits this to the managing server 1171 via the adapter 1161. The managing server 1171 selects the information to be provided to the user 1001 from the information stored within itself (or information to be generated), based on the information transmitted from the transmission/reception device 1151, and transmits this information to the transmission/reception device 1151 via the adapter 1161, whereby the transmission/reception device 1151 transmits the information transmitted from the managing server 1171 to the portable device 1002 via the signal electrode 1101.

Figure 10:
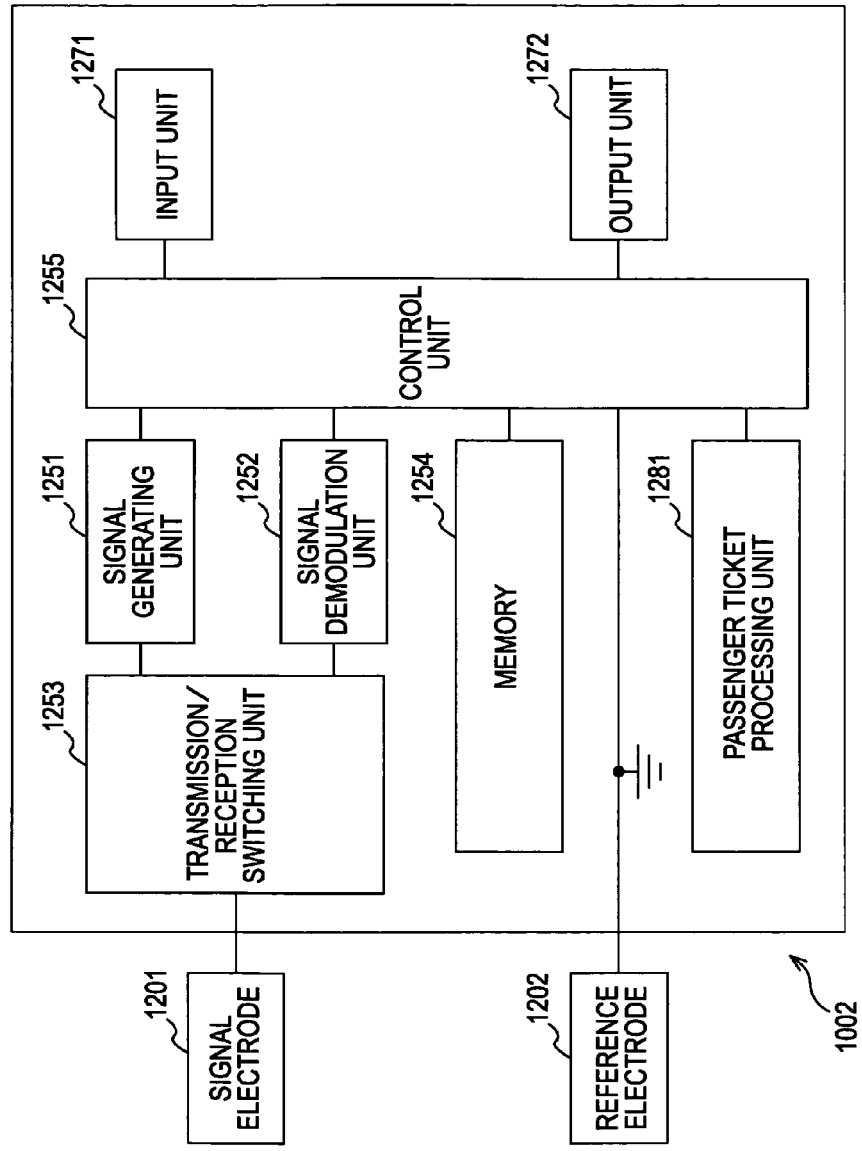
FIG. 10 is a block diagram illustrating a configuration example of a portable device in FIG. 9.

The portable device 1002 is a compact electronic device which is portable by a user, and for example, can be configured as a portable telephone. FIG. 10 is a block diagram showing an internal configuration example of the portable device 1002.

In the same diagram, the signal generating unit 1251 generates a signal corresponding to the information based on the control of the control unit 1255 when information is transmitted to the transmission/reception device 1151 and so forth, for example. When the signal modulation unit 1252 receives information (a signal corresponding to information) from the transmission/reception device 1151 and so forth, the signal modulation unit 1252 modulates the signal and supplies the modulated signal to the control unit 1255.

The transmission/reception switching unit 1253 switches the connection with the signal electrode 1201 for example to one of the signal generating unit 1251 or the signal demodulation unit 1252 based on control by the control unit 1255.

The control unit 1255 is configured including a CPU, ROM, and RAM or so forth, for example, and controls the operation of the signal generating unit 1251, the signal demodulation unit 1252 or the passenger ticket processing unit 1281 by executing various programs and so forth. For example, the control unit 1255 controls the signal generating unit 1251 or the signal demodulation unit 1252 and performs generating or demodulating of the signal transmitted/received with the transmission/reception device 1151 of the like. Also, the control unit 1255 controls the passenger ticket processing unit 1281 to execute purchasing processing of a passenger ticket for the purpose of riding a train or the like.

The memory 1254 is configured with an EEPROM (Electrically Erasable Programmable Read Only Memory) for example, and stores various information such as prepaid amounts of money, already purchased passenger tickets, or information transmitted from the transmission/reception device 1151, based on control by the control unit 1255. It should be noted that an individual ID is stored in the memory 1254 on the portable device 1002 (individual portable devices) in advance.

The reference electrode 1202 and the signal electrode 1201 are a reference electrode and signal electrode used for the wireless communication described above with reference to FIGS. 1 through 8, wherein the signal electrode 1201 is provided so as to be in close proximity to a communication medium (for example, a human body and so forth), and the reference electrode 1202 is provided so as to face open space. For example, the reference electrode 1202 corresponds to the transmission reference electrode 112 or the reception reference electrode 122 in FIG. 8, and the signal electrode 1201 corresponds to the transmission signal electrode 111 or the reception signal electrode 121 in FIG. 8. It should be noted that the communication medium can be a single physical object, or can be a combination of multiple conductors or dielectric units.

The passenger ticket processing unit 1281 executes purchasing processing when the user 1001 purchases a passenger ticket. Here the passenger ticket is stored in the memory 1254 of the portable device 1002 as predetermined data. The passenger ticket is configured as data including information of the zone from the departure station of the user 1001 to the destination station, for example, and when purchasing processing of the passenger ticket is executed, the fare corresponding to the above-described zone is deducted from the prepaid balance stored in the memory 1254. Also, effective period (date and time) information can be included on the passenger ticket, as necessary.

The passenger ticket processing unit 1281 executes the above-described purchasing processing of the passenger ticket by performing the wireless communication described above with reference to FIGS. 1 through 8, with the managing server 1171, or with a ticket sales machine not shown, via the signal electrode 1201. Also, the passenger ticket processing unit 1281 is configured so as to have a communication interface determined by regulations and so forth, for example, and so by performing wired or wireless communication with the ticket sales machine not shown, via this communication interface, and thus can execute the above-described purchasing processing of the passenger ticket.

The input unit 1271 is a functional block for inputting commands of the user 1001 as to the portable device 1002, and is configured with an operating key, button, or switch, for example. Alternatively, the input unit 1271 can be configured as a pressure sensor for detecting pressure when the user 1001 grips the portable device 1002, an acceleration sensor for acceleration pressure when the user 1001 swings the portable device 1002, an optical sensor for detecting whether or not the received light has transmitted, a biometric sensor for detecting living body information such as a fingerprint, and so forth.

The output 1272 is a functional block for the purpose of displaying information from the portable device 1002 as to the user 1001, and is configured so as to include a display configured with an LCD (Liquid Crystal Display) or the like for example. The output unit 1272 can be configured so as to also include a speaker which outputs audio, an LED (Light Emitting Diode) which flashes at predetermined intervals, a motor which notifies the user 1001 by vibrating, and so forth.

Figure 11:
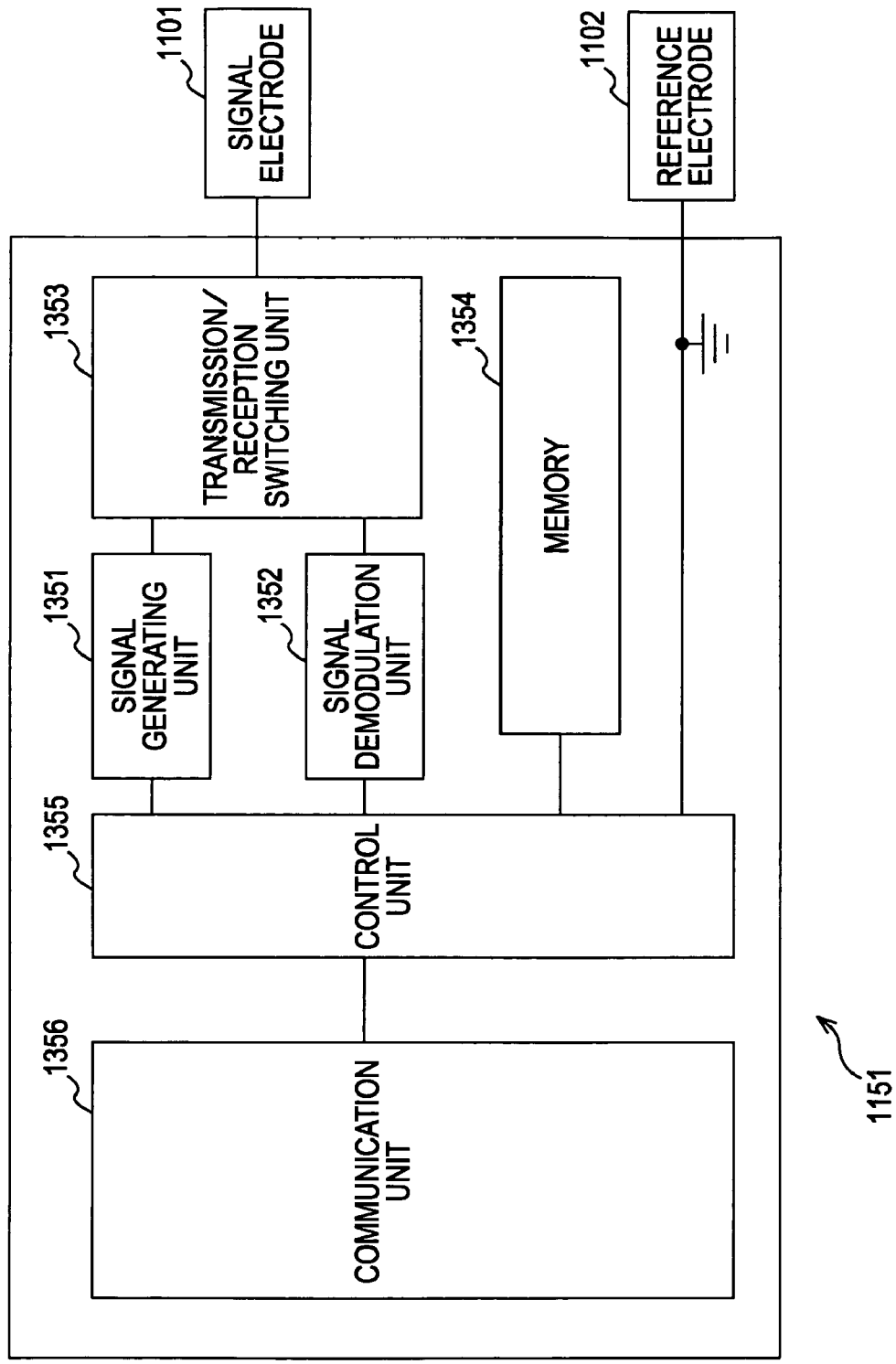
FIG. 11 is a block diagram illustrating a configuration example of a transmission/reception device in FIG. 9.

FIG. 11 is a block diagram illustrating an internal configuration example of the transmission/reception device 1151. Within the same diagram, the signal generating unit 1351 through the control unit 1355 configure a functional block corresponding to the signal generating unit 1251 through the control unit 1255 in FIG. 10, and since each has similar functionality, the detailed description thereof will be omitted.

The communication unit 1356 controls communication performed with the adapter 1161. The signal electrode 1101 corresponds to the signal electrode 1101 in FIG. 9, and is provided so as to electrostatically couple by being faced toward the human body of the user 1001, for example. The reference electrode 1102 is provided so as to face toward open space. For example, the reference electrode 1102 corresponds to the transmission reference electrode 112 or the reception reference electrode 122 in FIG. 8, and the signal electrode 1101 corresponds to the transmission signal electrode 111 or the reception signal electrode 121 in FIG. 8.

Figure 12:
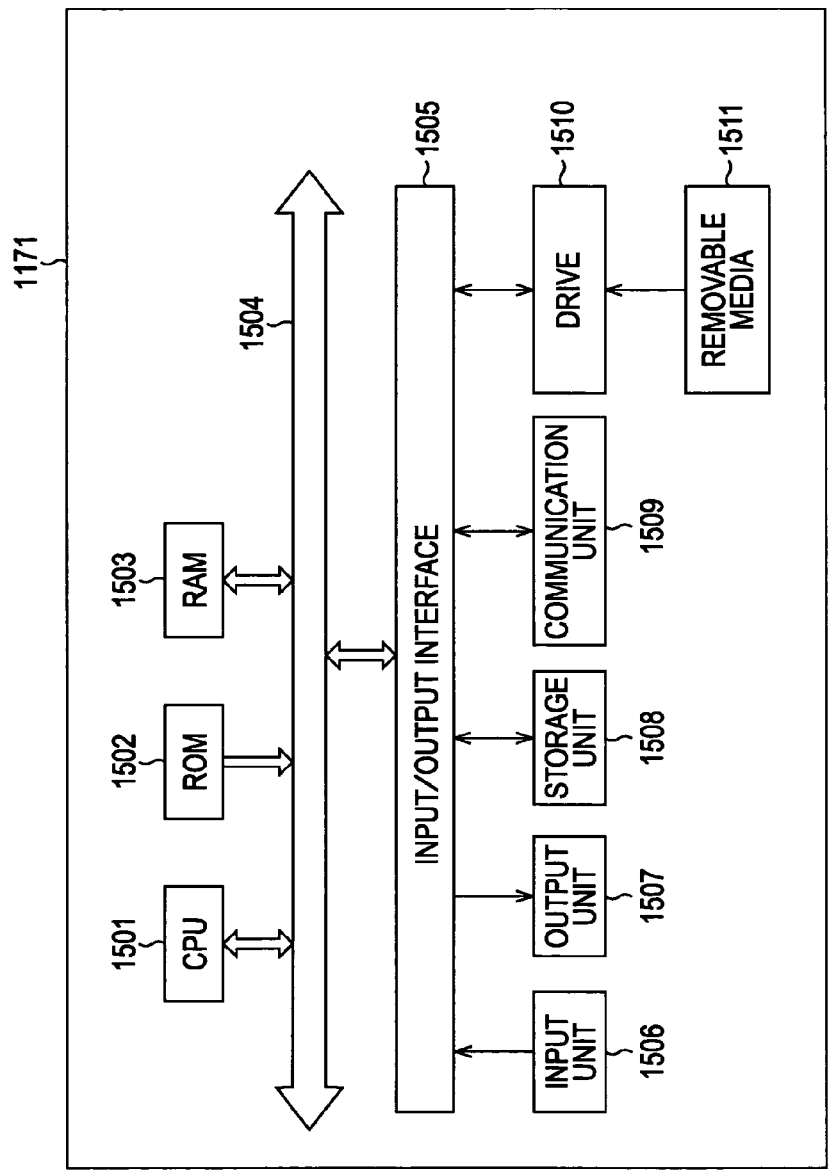
FIG. 12 is a block diagram illustrating a configuration example of a managing server 1171 in FIG. 9.

FIG. 12 is a block diagram showing an internal configuration example of the managing server 1171. In the same diagram, the CPU (Central Processing Unit) 1501 executes various processing according to programs stored in the ROM (Read Only Memory) 1502 or programs loaded from the storing unit 1508 to the RAM (Random Access Memory) 1503. Also, data necessary for the CPU 1501 to execute various processing is stored as appropriate on the RAM 1503.

The CPU 1501, ROM 1502, and RAM 1503 are each connected via a bus 1504. This bus 1504 is also connected to an input/output interface 1505.

The input/output interface 1505 is connected to an input unit 1506 formed with a keyboard, mouse, and so forth, a display formed with a CRT (Cathode Ray Tube), LCD (Liquid Crystal Display) and so forth, an output unit 1507 formed with speakers and so forth, a storage unit 1508 formed with a hard disk and so forth, and a communication unit 1509 configured with a modem and a network interface card such as a LAN card, and so forth. The communication unit 1509 performs communication with the adapter 1161, and also performs communication processing via the network 1181.

The input/output interface 1505 also is connected to a drive 1510 as necessary, and removable media 1511 such as a magnetic disk, optical disk, optical magnetic disk, or semiconductor memory is attached thereto as appropriate, wherein computer programs read out from these are installed on the storage unit 1508 as necessary.

Also, information transmitted from the server 1191 via the network 1181 is also stored on the storage unit 1508.

It should be noted that the server 1191 is also configured similar to the configuration described above with reference to FIG. 12, and so the same diagram can be applied as an internal configuration of the server 1191 as necessary.

Figure 13:
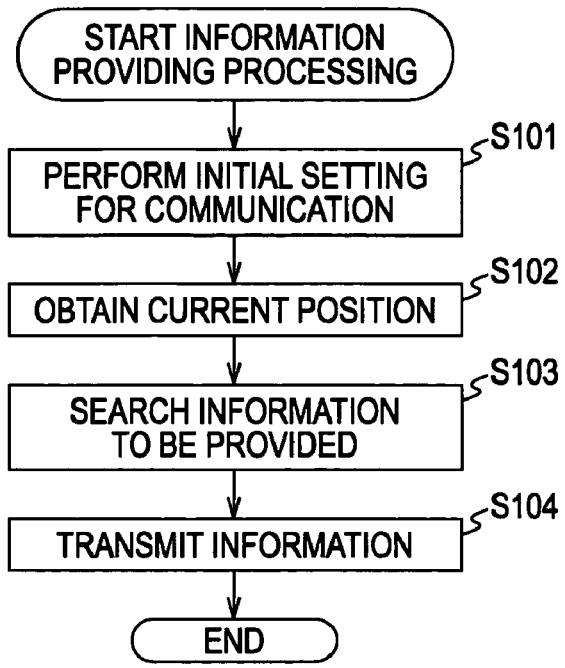
FIG. 13 is a flowchart describing an example of information providing processing.

Next, the information providing processing with the managing server 1171 will be described with reference to the flowchart in FIG. 13. This processing is executed, for example, when information indicating that communication with the portable device 1002 has become possible is notified to the managing server 1171 from the transmission/reception device 1151 (via the adapter 1161).

In step S101, the CPU 1501 of the managing server 1171 performs initial setting for communication. At this time, for example, information is obtained by the transmission/reception device 1151 such as the ID of the portable device 1002 or the passenger ticket, and is transmitted to the managing server 1171. Also, at this time, processing may be performed for mutual verification between the portable device 1002 and the managing server 1171 for verifying the validity of one another.

In step S102, the CPU 1501 obtains the information showing the current position of the user 1001 (the portable device 1002).

For example, during the processing of step S101, if the transmission/reception device having transmitted the information such as the ID of the portable device 1002 or the train ticket is the transmission/reception device 1151 loaded on the moving train, the information showing the point at which the train is currently running is obtained as information showing current position. The information showing the point at which the train is currently running can be obtained for example from another server connected to the train operating management system used by the railway company, or the transmission/reception device 1151 can perform periodic communication with the control device on the train, obtain the information relating to the point of running and store this on the memory 1354, and have the information be obtained by the managing server 1171.

Also, in the processing in step S101, if the transmission/reception device transmitting the information such as the ID of the portable device 1002 or the train ticket is the transmission/reception device 1151 disposed within the train station and so forth, the position information stored in advance in the memory 1354 of the transmission/reception device 1151 thereof is obtained as information showing the current position in step S102.

In step S103, the CPU 1501 searches for information to be provided to the user 1001 based on the information showing the current position obtained in step S102.

For example, in the case that the user 1001 is inside a moving train, information such as shops along the train route, sightseeing information along the train route, and information such as the amount of time before arriving at the destination station is searched as information to be provided. Also, in the case that the user 1001 is within a train station, information such as shops in the vicinity of the train station, or guides for changing trains, is searched as information to be provided.

In step S104, the CPU 1501 transmits the information searched out with the processing in step S103 to the transmission/reception device 1151 via the adapter 1161, and this is further transmitted to the portable device 1002.

Figure 14:
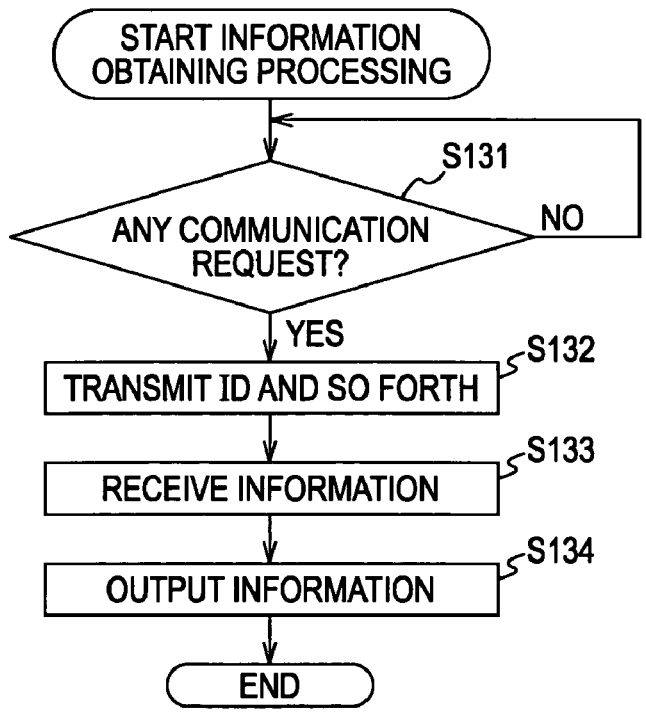
FIG. 14 is a flowchart describing an example of information providing processing.

FIG. 14 is a flowchart describing the processing (information obtaining processing) of the portable device 1002 performed corresponding to the processing described above with reference to FIG. 13.

In step S131, the control unit 1255 of the portable device 1002 determines whether or not there is any communication request from the transmission/reception device 1151, and waits until it is determined that a communication request has been made. In step S131, when it is determined that a communication request has been made, the processing advances to step S132.

In step S132, the control unit 1255 transmits the information such as the ID or train ticket stored on the memory 1254 to the transmission/reception device 1151, and this is further transmitted to the managing server 1171. Also, at this time, data necessary for mutual verification of the portable device 1002 and managing server 1171 for the purpose of verifying the validity of one another can be further transmitted.

In step S133, the control unit 1255 receives the information transmitted from the transmission/reception device 1151. Thus, the information transmitted with the processing in step S104 in FIG. 13 is received.

In step S134, the control unit 1255 outputs the information received in the processing in step S133 from the output unit 1272.

At this time, for example, an image may be displayed on the display, or audio may be output from the speakers. Alternatively, a predetermined message can be notified to the user 1001 by vibration of a motor, flashing of an LED, and so forth.

Thus, appropriate information can be provided to the user 1001 inside a moving train or to the user 1001 within a train station.

For example, with a navigation system using a GPS (Global Positioning System) as it has been up to now, it has been considered to provide information according to the current position of a user, but specifying the current position with a GPS has been difficult for users in a moving train (in particular, within a train such as an underground railway) or within a train station (in particular, within train stations of an underground railway and so forth). Conversely, according to the present invention, the current position of a user can be accurately obtained, whether in a moving train or within a train station, and more appropriate information can be provided.

For example, if the time required to reach the destination station (or the connection station) which is included in the information provided on the portable device 1002 is shorter than a predetermined threshold, the user 1001 can be notified not to ride too far, by a motor vibrating or an LED flashing, and guide diagrams such as that of the arrival train station platform can be displayed to the user 1001 in advance, so as to facilitate quicker train connections.

Figure 15:
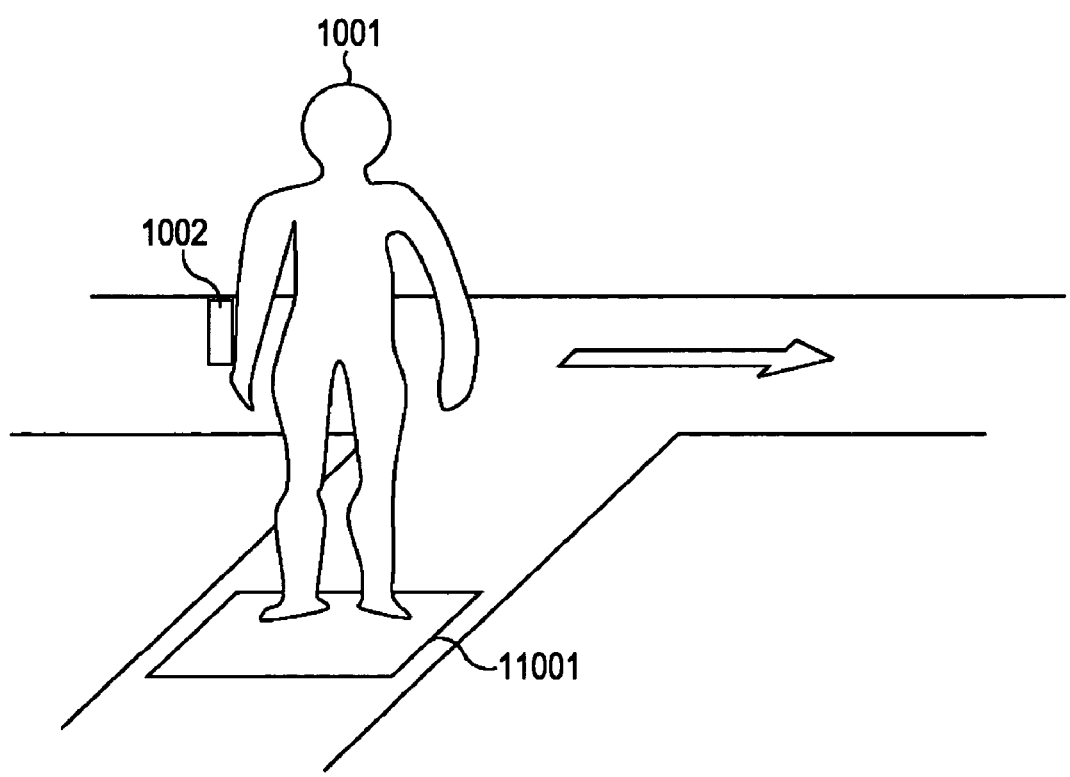
FIG. 15 is a diagram illustrating an example of guide of a train station interior.

Also, with a large-scale train station, the configuration within is often complicated, and a first-time passenger may have difficulty in changing trains or moving to the desired exit. In such cases, for example, as shown in FIG. 15, by providing information to the user 1001 to advance in a certain direction (the arrows in the diagram) according to the locations of the embedded signal electrodes 1101, the convenience for the user can be improved.

Thus, when guiding the movements of the user 1001 with the portable device 1002 (navigation), for example, the user 1001 travel route can be obtained from the departure station information and arrival station information on the passenger ticket in the obtained portable device 1002 with the server 1171, and this route information can be transmitted to the portable device 1002, the control unit 1255 of the portable device 1002 can read out the map information stored in advance in the memory 1254 and so forth, based on the route information and the current position, and can display the map information on the display as necessary.

Further, the map information can be downloadable from the server 1171, and for example can be configured so that the map information is updated along with the progression of the train. Further, similar to a car navigation system as it has been up to now, for example, the control unit 1255 of the server 1171 or portable device 1002 determines whether or not the user 1001 is approaching the vicinity of the branch point or connection station in the route thereof, based on the current position information, and if the user 1001 is determined to be approaching the vicinity of the branch point or connection station in the route thereof, a guide can be displayed or a warning (display, audio, vibration, and so forth) can be given.

Now, the information provided to the user holding the portable device 1002 is not limited to within a train or train station. For example, information can be provided at the same time as the user purchasing the passenger ticket.

Figure 16:
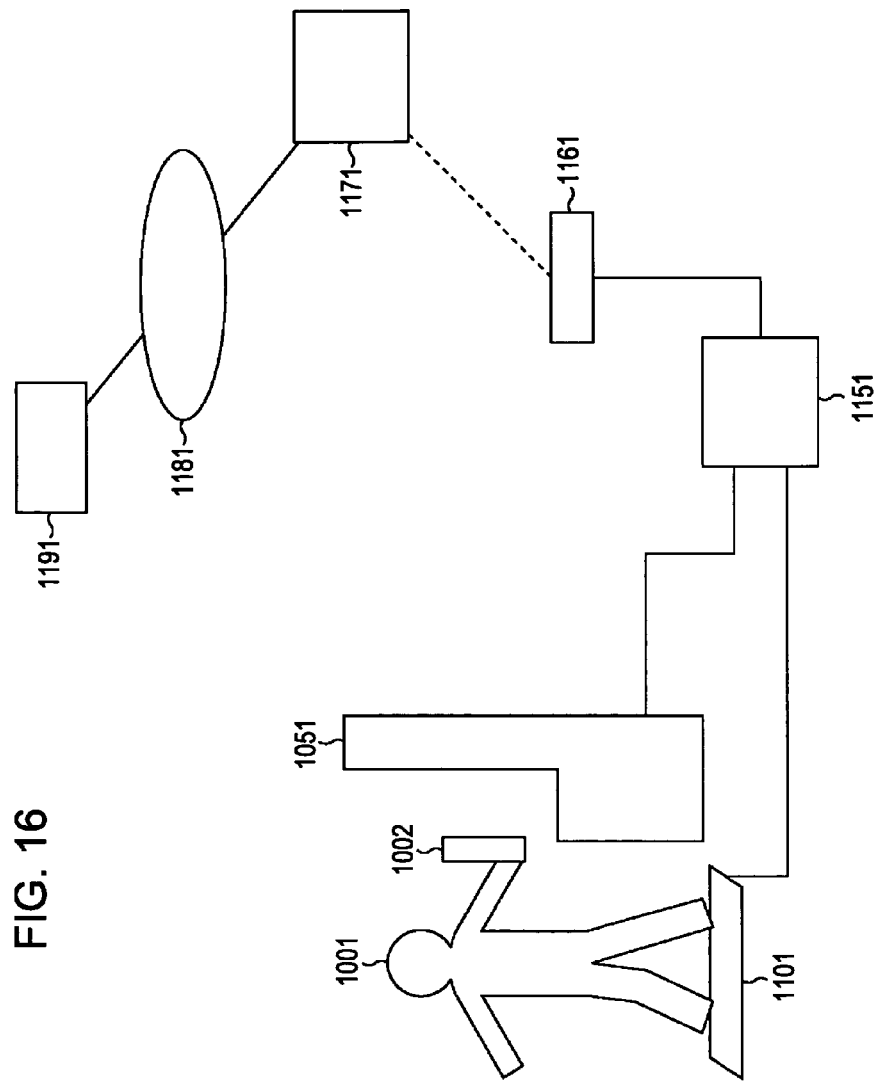
FIG. 16 is a diagram illustrating another configuration example relating to an embodiment of an information providing system using the present invention.

FIG. 16 is a diagram showing another configuration example relating to an embodiment of the information providing system using the present invention.

In the same diagram, the user 1001 holding the portable device 1002 purchases a passenger ticket using the ticket sales machine 1051. As described above, the passenger ticket is stored in the memory 1254 of the portable device 1002 as predetermined data, and is configured as data including information of the zone from the departure station to the arrival station.

It should be noted that the purchasing processing of a passenger ticket is executed with the passenger ticket processing unit 1281, as described above.

The ticket sales machine 1051 can be configured, for example, with buttons and so forth to specify the destination station, and according to the operation of the user 1001, the data including information of the zone from the departure station to the destination station is transmitted as a passenger ticket to the passenger ticket processing unit 1281 of the portable device 1002, while at the same time billing corresponding to the passenger ticket (for example, deduction of a prepaid balance) is performed.

The communication between the ticket sales machine 1051 and the passenger ticket processing unit 1281 can be performed via the signal electrode 1101 embedded in the position where the user 1001 is standing and the signal electrode 1201 in the portable device 1002, or for example, can be performed via a communication interface specified by regulations binding both of the passenger ticket processing unit 1281 and the ticket sales machine 1051. Alternatively, a network connection function of the portable telephone (portable device 1002) can be used for the portable device 1002 to connect (access) the server 1171 directly and purchase the passenger ticket.

The ticket sales machine 1051 is connected to the transmission/reception device 1151, and communication between the ticket sales machine 1051 and portable device 1002 (passenger ticket processing unit 1281) is performed via the transmission/reception device 1151 when the signal electrode 1101 and the passenger ticket processing unit 1281 perform communication via the signal electrode 1201 of the portable device 1002.

Also, in the same diagram, similar to the case described above with reference to FIG. 9, the transmission/reception device 1151 is connected to the adapter 1161, and is configured so that communication can be made with the managing server 1171, and the managing server 1171 is configured so that communication can be made with another server via the network 1181.

With the example in FIG. 16, the information of the zone of the passenger ticket issued (transmitted) by the ticket sales machine 1051 is obtained by the managing server 1171 via the transmission/reception device 1151 and adapter 1161. Accordingly, the managing server 1171 can select appropriate information according to the destination station on the passenger ticket, and can provide this to the portable device 1002 of the user 1001.

Figure 17:
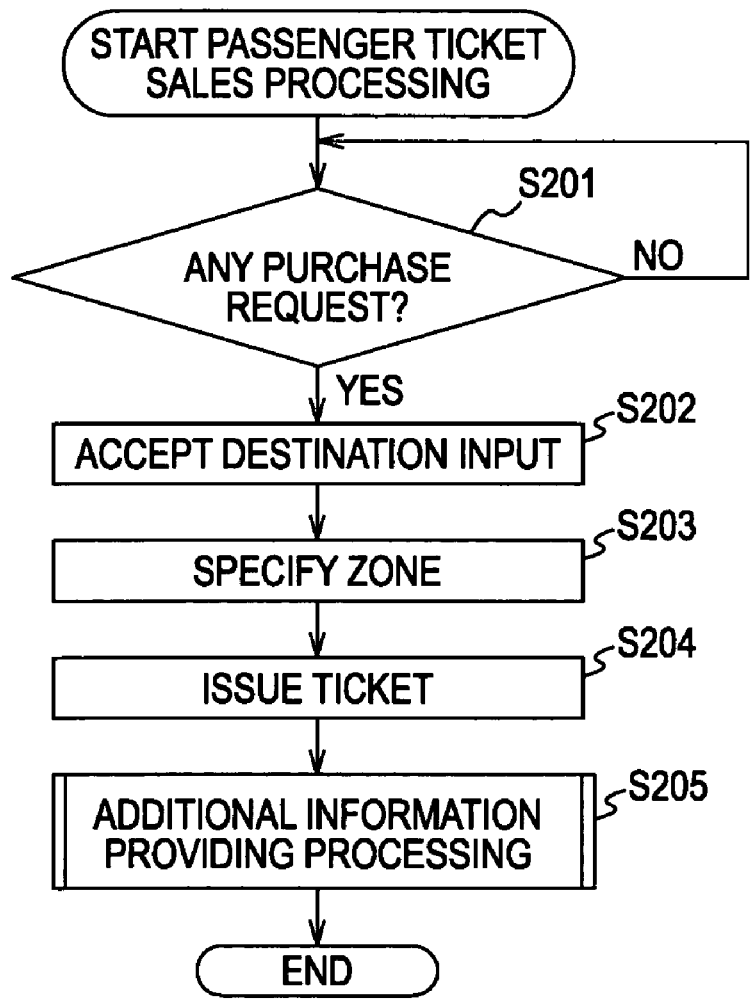
FIG. 17 is a flowchart describing an example of a passenger ticket sales processing.

Next, an example of passenger ticket sales processing by the ticket sales machine 1051 when performing information providing at the time that the user purchases the passenger ticket will be described with reference to the flowchart in FIG. 17.

With step S201, the ticket sales machine 1051 determines whether or not there is any purchase request for a passenger ticket, and waits until it is determined that a purchase request has been made. Here, the purchase request can be considered as being a purchase request when predetermined data is input corresponding to the user 1001 operating a predetermined button on the ticket sales machine 1051, or when the user 1001 stands near the ticket sales machine 1051, communication can be performed between the portable device 1002 and transmission/reception device 1151 via the signal electrode 1101 and this can be considered to be a purchase request.

When there has been determined to be a purchase request in step S201, the processing advances to step S202, and the ticket sales machine 1051 accepts destination input. Thus the destination station of the user 1001 is determined.

In step S203, the ticket sales machine 1051 specifies the zone for the passenger ticket (from the departure station to the destination station), based on the destination station information accepted by input in step S202. It should be noted that the departure station information on the passenger ticket is set in advance corresponding to the set location (set station) of the ticket sales machine.

In step S204, the ticket sales machine 1051 issues a passenger ticket. Thus, the passenger ticket data of the zone specified with the processing in step S203 is transmitted to the passenger ticket processing unit 1281 of the portable device 1002 and is stored in the memory 1254, while billing is performed for the fare for the passenger ticket, and the balance of the prepaid amount of money stored in the memory 1254 is deducted.

Then, the information for the passenger ticket issued in step S204 is transmitted to the managing server 1171 via the transmission/reception device 1151 and the adapter 1161, and in step S205 the managing server 1171 executes attached information providing processing to be described below with reference to FIG. 18. Thus, information corresponding to the destination station is transmitted to the portable device 1002.

Here, the attached information providing processing in step S205 in FIG. 17 will be described in detail with reference to the flowchart in FIG. 18.

In step S221, the CPU 1501 of the managing server 1171 obtains information of the destination station on the passenger ticket.

In step S222, the CPU 1501 searches for information to provide to the portable device 1002 (the user 1001).

As described above, the storage unit 1508 of the managing server 1171 has information stored within in advance which is transmitted from the server 1191 and is related to stores, products, services, and so forth to be provided to the user holding the portable device. Here, such information is stored corresponding to the destination station, for example, as shown in FIG. 19.

Figures 18, 19:
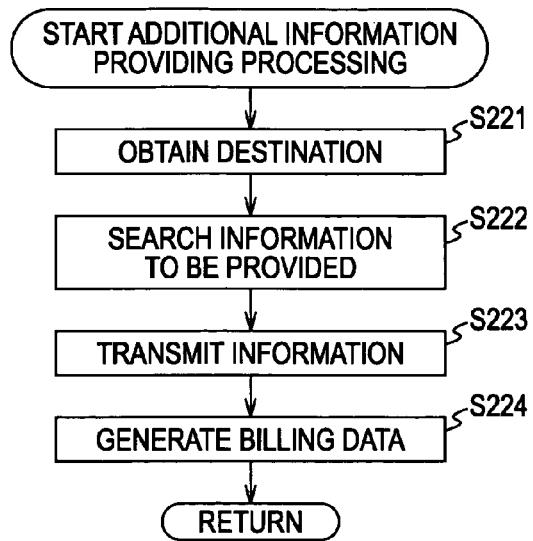
FIG. 18 is a flowchart describing an example of an attached information providing processing.
FIG. 19 is a diagram illustrating an example of information stored in a storage unit of the managing server.

FIG. 19 is a diagram showing an example of the information stored in the storage unit 1508 of the managing server 1171. As shown in the same diagram, information about various companies corresponding to the individual destination stations is stored. For example, corresponding to destination "AA station", information for Company A through Company C is stored. Here, each of Company A through Company C are stores or service providing companies which manage the server 1191, and the information for each of Company A through Company C is actually information that each company desires to provide to the user 1001, and are in the form of sale information, store maps, or coupons (to be described below).

Similarly, corresponding to destination "BB station", information for Company D through Company G is stored, and corresponding to destination "CC station", information for Company H and Company I is stored.

In step S222, information provided to the portable device 1002 (user 1001) is searched based on the destination station. For example, when the information obtained in step S221 for the destination station is "CC station", with the processing in step S222 the information for Company H and the information for Company I are to be searched as information to be provided to the user 1001.

Returning to FIG. 18, in step S223, the CPU 1501 transmits the information searched by the processing in step S222 as attached information to the portable device 1002 via the transmission/reception device 1151. The attached information transmitted here is stored on the memory 1254 of the portable device 1002, for example. Also, at this time, the information of the passenger ticket issued with the processing in step S204 and the attached information transmitted with the processing in step S223 can be displayed on the display making up the output unit 1272 of the portable device 1002.

Figure 20:
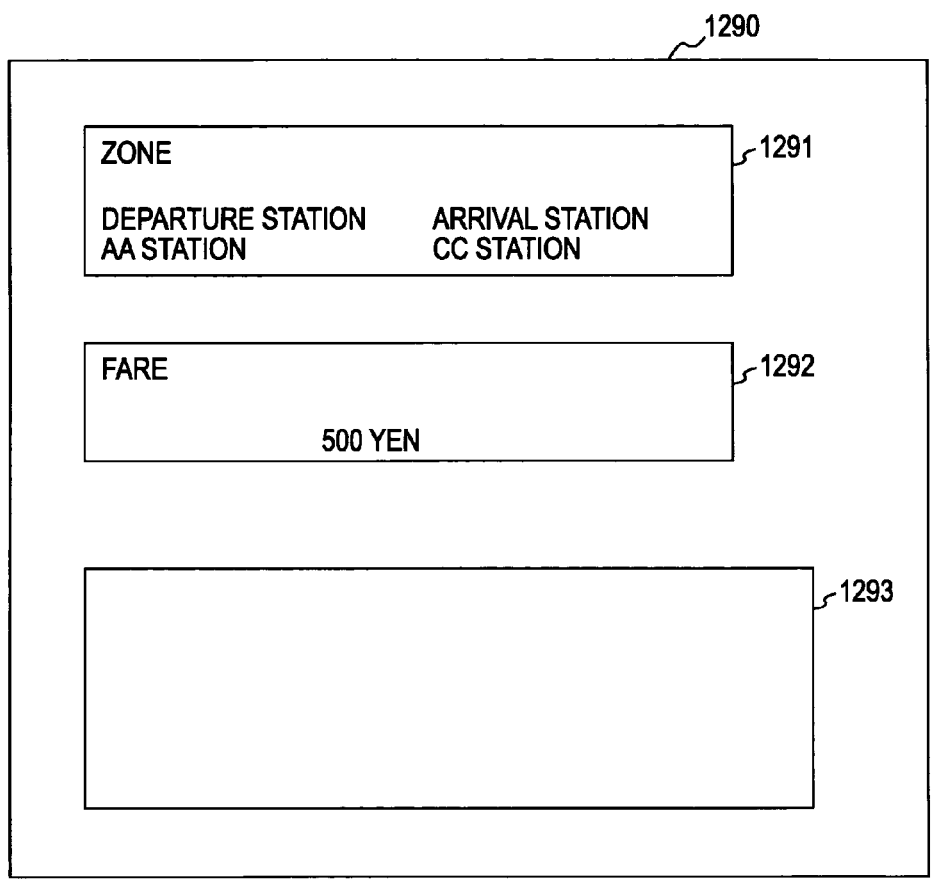
FIG. 20 is a diagram illustrating an example of a screen displayed on a portable device display.

FIG. 20 is a diagram illustrating a display example of a screen 1290 which is the display of the output unit 1272 in this case.

In the same diagram, the region 1291 in the screen 1290 the information for the passenger ticket zone is displayed, and in this example, the departure station is displayed as "AA station" and the destination station as "CC station".

Also, information about the fare for the passenger ticket is displayed in the region 1292 of the screen 1290, and in this example, the amount is displayed as 500 yen.

The region 1293 below the region 1292 is a region wherein the attached information transmitted in step S223 is to be displayed.

Figure 21:
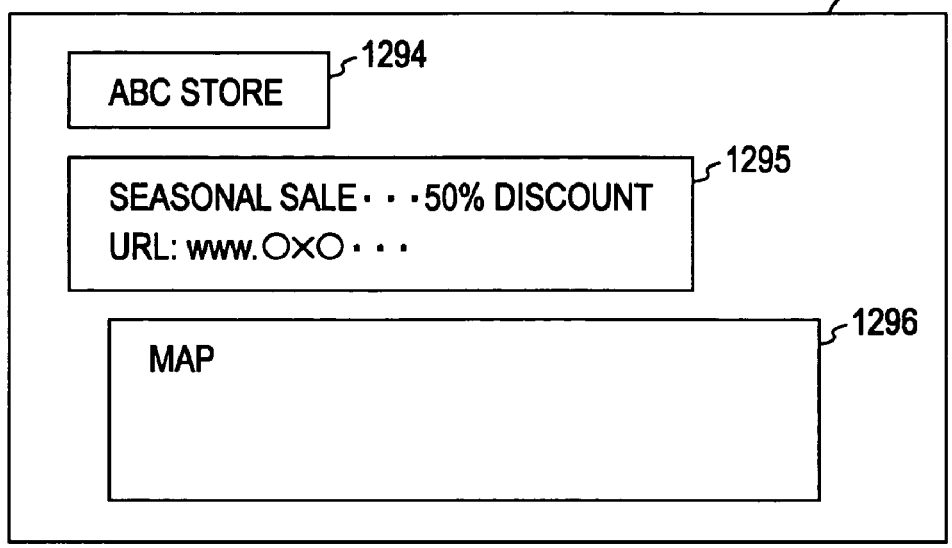
FIG. 21 is a diagram illustrating a detailed display example of a region within the screen in FIG. 20.
Figure 22:
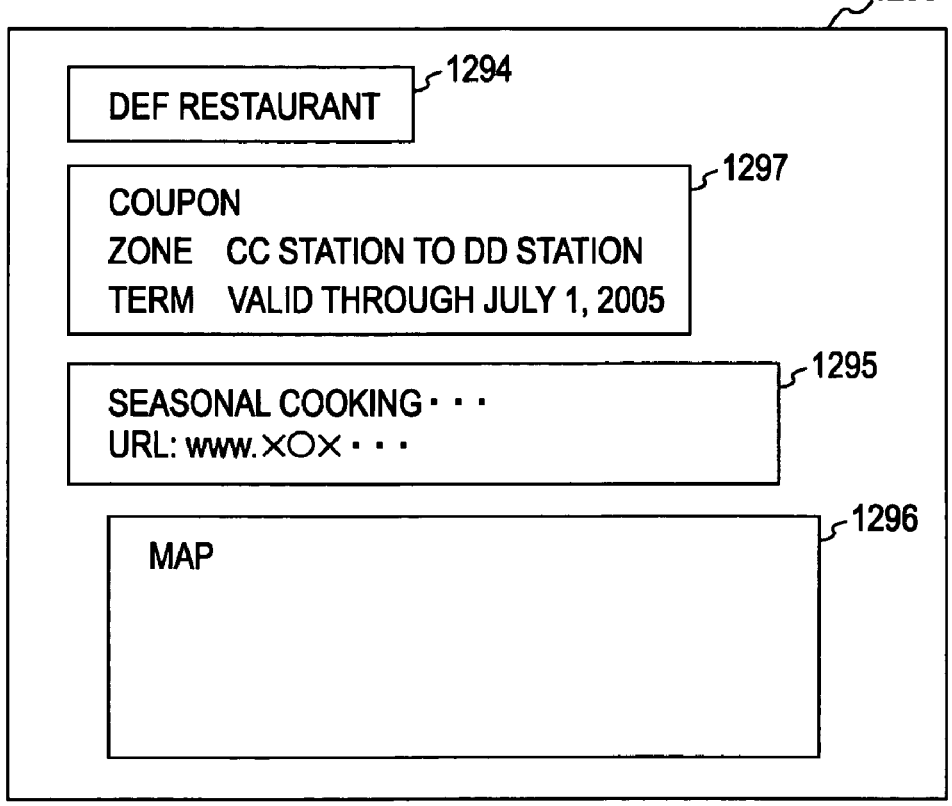
FIG. 22 is a diagram illustrating another detailed display example of a region within the screen in FIG. 20.

FIGS. 21 and 22 are diagrams showing examples of attached information displayed in region 1293.

In the example in FIG. 21, the provider name (advertiser) of the information in region 1294 within the region 1293 wherein attached information is displayed, is displayed and in this example, is displayed as "ABC Store". Also, advertising content is displayed in the region 1295 within the region 1293, and in this example, is displayed as "Season sale—50% discount", and is also displayed with the store URL (Uniform Resource Locator). Further, a map from the station "CC station" to the store can be displayed in the region 1296 within the region 1293.

Thus, attached information corresponding to the destination station is displayed along with the passenger ticket information. Thus, the user can obtain information for stores providing desired products or services at lower prices, and convenience can be improved.

In the example of FIG. 22, similar to the case in FIG. 21, the provider name (advertiser) of the information in region 1294 within the region 1293 wherein attached information is displayed, is displayed, and advertising content is displayed in the region 1295 within the region 1293, and for example a map from the station "DD station" to the store can be displayed in the region 1296 within the region 1293.

In the example in FIG. 22, further information about coupons is displayed in the region 1297 within the region 1293 wherein attached information is displayed. In this example, the display shows the zone "CC station through DD station", and the term shows "valid through Jul. 1, 2005".

Here the coupon is attached information provided in order to encourage the user to visit the shop by the advertiser providing the train fare thereto. In the current case, the destination of the user 1001 of the portable device 1002 obtained from the coupon as attached information shown in FIG. 22 is "CC station", but indicates that the fare for the user 1001 to travel to "DD station" which is farther down the line than "CC station" (the fare for the zone "CC station through DD station") will be paid by the DEF Restaurant which is the advertiser. In other words, if the user 1001 travels past the destination "CC station" on the passenger ticket and travels to "DD station", and eats and so forth at the restaurant DEF which is in the vicinity of the "DD station", the portion of the additional fare for traveling farther is refunded to the user 1001.

It should be noted that the fare for traveling the additional distance can be refunded by having the user 1001 show the display of the portable device 1002 to a shop attendant at the DEF Restaurant, for example, or the coupon information stored in the portable device 1002 can be read by a terminal disposed in the DEF Restaurant, and a prepaid amount corresponding to the additional fare can be automatically charged and thus refunded.

Thus by providing a coupon as additional information, the store can provide an incentive to the user who is arriving at a nearby train station ("CC station" in the current situation) to come to the shop of the store owner (encourages shopping). Thus, the information provider (advertiser) can advertise the products and services of the store thereof to a large number of users coming to the terminal in the case that the shop is in the vicinity of a large-scale train station terminal, and by paying the additional fare, can have users come to the shop. For example, even if a user understands that a desired product or service is provided at a lower price at a store in the vicinity of a train station differing from the destination station, but it may be difficult to have a user pay an additional fare to come to a shop the user has never visited, but by the store paying the fare difference, the probability of the user visiting the store greatly increases.

Further, the user can discover information about stores near shops close to the destination station, and can search for shops providing desired products or service at a lower price and so forth without paying for shipping, and further, the railway company increases revenue by the amount of the additional fares, and so along with the increased convenience to the customer, a higher economic advantage can be expected.

Here, an example has been described of an additional fare amount, but for example, the user could get off the train temporarily and then reboard the train and go to the destination.

Returning to FIG. 18, after the processing in step S223, the processing advances to step S224, and the CPU 1501 generates billing data corresponding to the attached information provided (the information transmitted in step S223). At this time, for example, the fees for the service of providing information (advertising) to the user 1001 is generated as billing data for the purpose of billing the provider of attached information (advertiser). The fees for providing information can be determined in advance, for example, as an amount for providing information one time, between the manager of the managing server 1171 (for example, the railway company) and the advertiser, and calculations can be made based on this agreement.

Thus, the transportation company such as the railway company can start a new service as an agent providing information to the passenger.

With the above, an example has been described wherein attached information is provided at the time the passenger ticket is purchased, but the attached information can be transmitted to the portable device 1002 and thus provided while the user is in the train or at the destination (or at a connection) station.

Also, with the above, an example has been described wherein information is provided to the portable device 1002 based on the "destination station" information on the passenger ticket, but information can also be provided to the portable device 1002 based on the "departure station" information on the passenger ticket. It should be noted that there is a potential problem in the case of providing information based on the "departure station" information on the ticket, due to the unknown factor of when the user will return to the departure station. For example, if the user departs at 10:00 am and goes to a destination where the user cannot return by lunchtime, it is meaningless to provide a lunch coupon in the vicinity of the departure station. When providing information based on the departure station, for example, information to be provided should be searched with the server 1171 so as to estimate the time at which the user will return to the departure station, and provide the searched information to the portable device 1002.

With the above-described example, the situation is described wherein advertising is displayed as attached information to be displayed along with information about the passenger ticket zone or fare information, but the advertising can also be displayed with content such as moving images, for example, such as a commercial on a television broadcast.

For example, a signal for content with compression coding with a method such as MPEG (Motion Picture Experts Group) and advertising data can be output from the signal electrode 1101 in FIG. 9, and the portable device 1002 receives this signal, and decodes (reproduces) the compression coded content and advertising data, and this can be displayed on the content and advertising image display.

In this case, the content and advertising data can be stored in the storage unit 1508 in the managing server 1171, as shown in FIG. 23. The managing server 1171 transmits the compression coded content and advertising data to the transmission/reception device 1151 via the adapter 1161, and the transmission/reception device 1151 outputs the data received from the managing server 1171 as a signal from the signal electrode 1101. It should be noted, as shown in FIG. 23, that the content data is not limited to moving image data, but can also be data such as still images, audio, text, and so forth. Also, the advertising data can be URL or email information (for example, an address and so forth) in addition to data such as images (moving images, still images), audio, text, and so forth.

For example, the portable device 1002 having received a signal corresponding to the content and advertising data configured with compression coded image and audio data reproduces the images and audio of the content and advertising by decoding the compression coded data with the control unit 1255, outputs the reproduced images and audio from the display and speaker of the output unit 1272, and provides to the user 1001 for viewing and listening. Thus, the user 1001 who is in the train station during a commute to work or school, for example, can view and listen to the content and advertising using the portable device 1002.

It should be noted that the content and advertising data shown in FIG. 23 actually has multiple data, and the signals corresponding to multiple content and multiple advertising data are output simultaneously from the signal electrode 1101. The portable device 1002 can be configured so that the user thereof can reproduce desired content by operating an input unit 1271 and so forth, for example.

Thus, the data stored in the managing server 1171 can be broadcast for example as a television broadcast as it has been up to now, and is received by an unspecified large number of portable devices of users walking above the signal electrodes 1101. Also, as described above with this situation, for example, the service fees for performing information providing (advertising) to the users 1001 can be billed to the advertisers.

However, it can be difficult to verify whether the broadcast advertising is actually viewed or listened to. For example, with the situation of watching television as it has been up to now, information such as the viewing history and so forth of a sample extraction of viewers is recorded, and based on the recorded information, estimation is made as to what percentage of all viewers have viewed, but it may be extremely difficult to extract an appropriate sample with portable devices which individual users have and carry around. Also, in recent years, with affiliated services using the Internet, billing is often made based on the records wherein a user accessing a home page clicks on a banner advertisement, but such a billing method increases cost greatly for user management and so forth, and is not suitable for distributing a large amount of data at one time.

Therefore with the present invention, data such as the above-described coupons or discount tickets are attached to advertising data, and when the terminal and so forth disposed in the store of an advertiser reads this coupon information stored on the portable device 1002, information about history relating to advertising reproduction stored in the memory and so forth of the portable device 1002 is read out, and the advertising information reproduced by the manager of the managing server 1171 can be obtained.

As described above, by providing coupons as attached information (advertising in this case), an incentive to visit the store can be provided to the user, and therefore reading the history relating to reproduction of advertising stored on the memory of the portable device of each user can be made easier. Thus by performing billing based on the information obtained by collecting information obtained from individual portable devices, more accurate billing can be performed.

Thus, when broadcasting the content and advertising data, multiple channel communication can be realized by using a frequency division method which divides the frequency bandwidth of the signals transmitted and received between the signal electrode 1101 of the transmission/reception device 1151 and the signal electrode 1201 of the portable device 1002 into multiple regions.

In other words, as shown in FIG. 24, signals transmitted and received between the signal electrode 1101 of the transmission/reception device 1151 and the signal electrode 1201 of the portable device 1002 are set as multiple channels, and of the multiple channels, one channel is set as the content channel, whereby a signal corresponding to the content data is sent with the content channel, and other channels are set as advertising channels, whereby signals corresponding to advertising data is transmitted with the advertising channels.

The advertising data with the managing server 1171 is configured so as to be stored corresponding to the destination station (or departure station), similar to the case described above with reference to FIG. 19, and the multiple (or singular) advertising data corresponding to the individual destination station (or departure station), are transmitted on each advertising channel.

For example, the i number of advertising data of the CM1-1 through CM1-i corresponding to "AA station" is transmitted on the advertising channel 1, the CM2-1 through CM2-i corresponding to "CC station" is transmitted on the advertising channel 2, the CM3-1 through CM3-i corresponding to "DD station" is transmitted on the advertising channel 3, and so forth, transmitting the multiple (or singular) advertising data corresponding to the individual destination stations (or departure stations) on the various advertising channels. Here the CM1-1 through CM3-i are codes which identify the advertising data.

Also, the managing server 1171 specifies the destination station of the user 1001 based on the passenger ticket information and so forth stored in the memory 1254 of the portable device 1002, and the advertising channel signal whereby the advertising data is transmitted corresponding to this destination station is received by the portable device 1002 via the transmission/reception device 1151. Alternatively, the portable device 1002 receives the signals for all advertising channels, and specifies the destination station of the user 1001 based on the passenger ticket information and so forth stored in the memory 1254 therein, and selects data corresponding to the signal of the advertising channel whereby advertising data corresponding to the destination station is transmitted, and this can then be decoded (reproduced).

Figure 25:
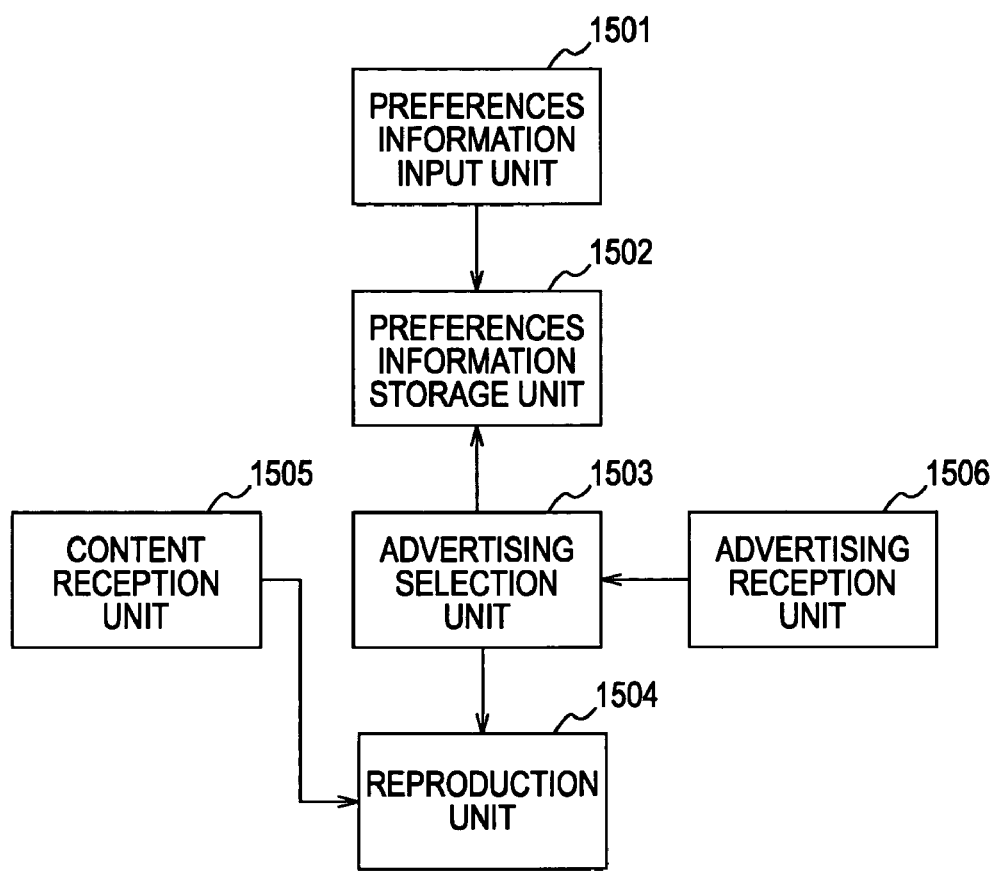
FIG. 25 is a block diagram illustrating a functional configuration example of software executed with a control unit of the portable device.

Also, advertising data thus broadcasted does not need to all be reproduced, but for example, only the advertising necessary according to the tastes or preferences of the user may be set to be reproduced. Thus, a software function configuration example shown in FIG. 25 is implemented and executed by the control unit 1255 of the portable device 1002 when reproducing the advertising data selected from the multiple advertising data broadcast on the predetermined advertising channels along with the content data to be broadcast on the content channel.

In the same diagram, the preferences information input unit 1501 accepts input for preferences information which is information relating to the preferences of the user 1001. The preferences information, for example, can be input by the user 1001 operating the input unit 1271 of the portable device 1002.

The preferences information storage unit 1502 stores the preferences information of the user 1001 of which input has been accepted from the preferences information input unit 1501.

An advertising selecting unit 1503 selects advertising data which is determined as appropriate to the preferences of the user 1001 from multiple advertising data, by performing matching of the preferences information stored in the preferences information storage unit 1502 and the information included in the metadata and the like attached to each of the multiple advertising data, thereby outputting only selected advertising data to the reproducing unit 1504.

The reproducing unit 1504 is content data or advertising data supplied therein, and for example, is configured so as to perform data reproduction by executing processing to decode the data compression coded by methods such as MPEG, and outputting the decoded results of the data to the output unit 1272. Also, the reproducing unit 1504 is configured so as to decode the encoded data with a predetermined algorithm as necessary.

The content reception unit 1505 receives a signal corresponding to the content data transmitted on the content channel with the signal transmitted from the transmission/reception device 1151, and supplies the data (for example, compression coded image or audio data) corresponding to this signal to the reproducing unit 1504.

The advertising reception unit 1506 receives a data signal for the advertising channel selected corresponding to the destination station (or departure station) and so forth of the user 1001 from the above-described multiple advertising channels. In other words, the advertising reception unit 1506 selects a predetermined advertising channel from the multiple advertising channels of the signals transmitted from the transmission/reception device 1151, receives the signal corresponding to the advertising data transmitted with the selected advertising channel, and supplies the data (for example, compression coded image, audio data, or metadata of the advertising thereof) corresponding to this signal to the advertising selecting unit 1503.

Next, the preferences information will be described. The preferences information is information which is input via the preferences information input unit 1501, and is information necessary for selecting the advertising to be reproduced as described above. For example, this can be information which the user has selected items as items of interest from a previously set items list, or information which the use has selected as items not of interest from a previously set items list. Here, the items which the user selected as items of interest from a previously set and hierarchized items list will be described as an example of preferences information.

Figure 26:
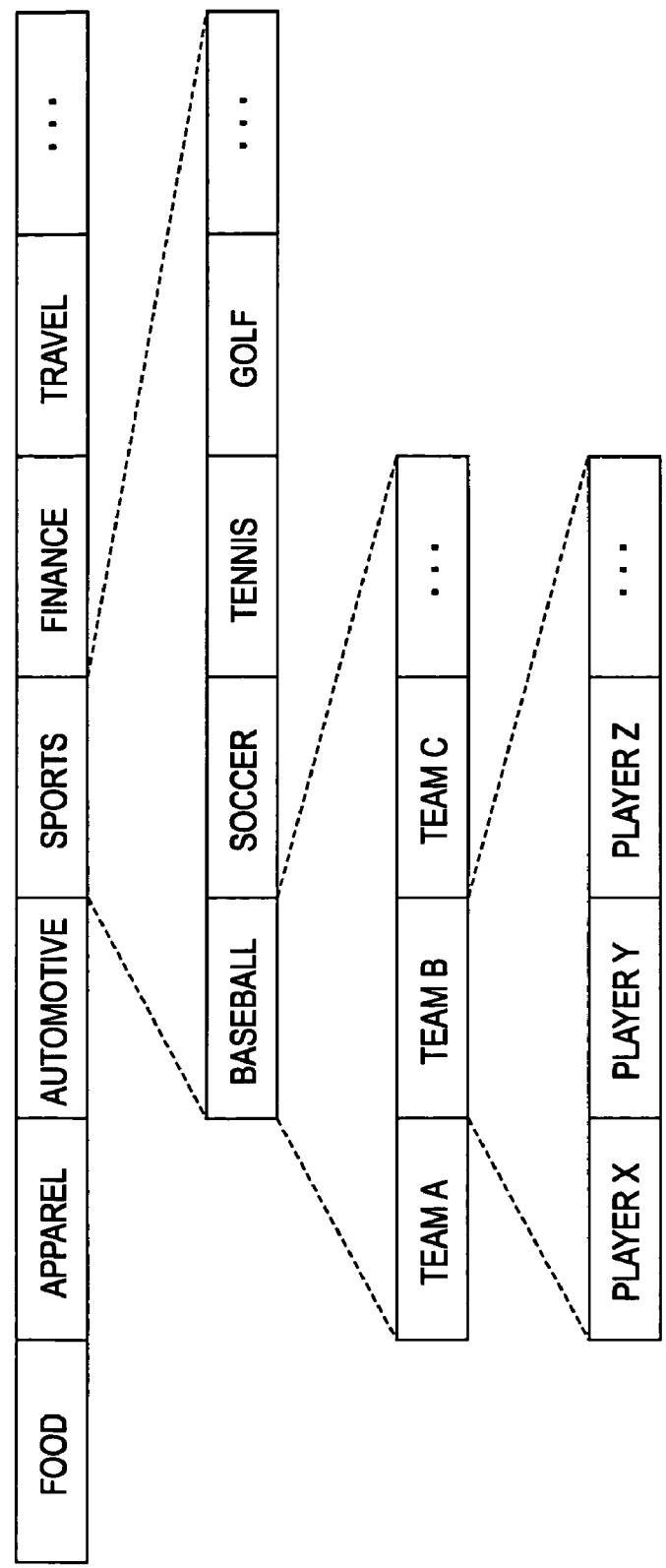
FIG. 26 is a diagram illustrating an example of layered items configuring preferences information.

FIG. 26 is a diagram showing an example of items hierarchized which make up the preferences information. In this example, the items previously set are hierarchized into 4 layers. In other words, in the first layer shown on the uppermost side in the diagram, items such as "food", "apparel", "automotive", "sports", "finance", "travel", and so on, are listed. A second layer of items are corresponded to each of the items in the first layer. For example, corresponding to "sports" in the first layer, the second layer lists "baseball", "soccer", "tennis", "golf", and so on, are listed.

Also, a third layer of items are corresponded to each of the items in the second layer. For example, corresponding to "baseball" in the second layer, items such as "team A", "team B", "team C", and so forth are listed, and items in a fourth layer such as "player X", "player Y", "player Z" and so forth are corresponded to the item "team B" in the third layer.

The preferences information input unit 1501 displays previously set items as shown in FIG. 26 in the display of the output unit 1272 for each layer, for example. When the user 1001 operates the input unit 1271 and selects the displayed item, the items in the next layer are displayed in order, and the preferences information of the user 1001 can be input. It should be noted that the user 1001 does not always need to select items through to the fourth layer, and for example, may select items only in the first through third layers. Also, multiple items may be selected within each layer. The preferences information thus input is stored in the preferences information storage unit 1502 (for example, stored in the region of the memory 1254 previously determined).

Also, the items in the various layers shown in FIG. 26 are also attached to each of the multiple advertising data. For example, the various items in the first through fourth layers may be coded, and may be included in the metadata of the advertising thereof.

The advertising selecting unit 1503 selects advertising to be reproduced, by performing matching and so forth between the preferences information of the user 1001 stored in the preferences information storage unit 1502 and the codes included in the above-described advertising metadata. In other words, the advertising selecting unit 1503 supplies the advertising data attached to the metadata including codes of items which match the items selected as preferences information to the reproducing unit 1504 as the advertising data to be reproduced, for example.

It should be noted that the above-described example is one example of the preferences information, and for example the preferences information can be configured so that user 1001 specifies an arbitrary keyword as the preferences information, the advertising selecting unit 1503 searches this keyword from the advertising metadata, and the advertising data attached to the metadata including the keyword is supplied to the reproducing unit 1504 as the advertising data to be reproduced.

Figure 27:
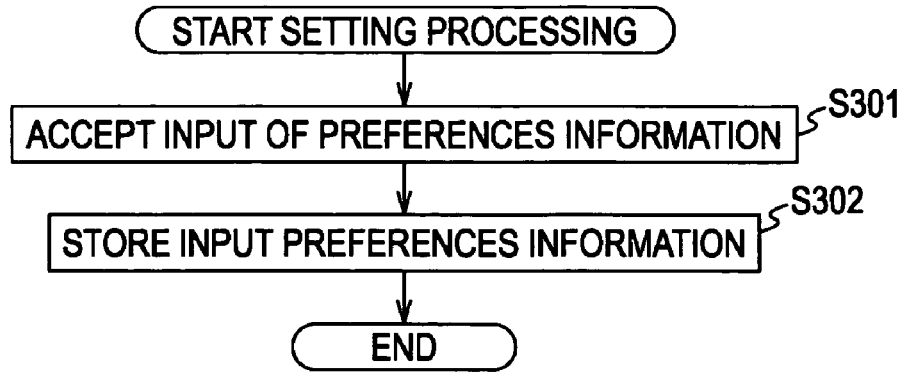
FIG. 27 is a flowchart describing an example of a settings processing.

Next, the setting processing for setting the preferences information will be described with reference to the flowchart in FIG. 27.

In step S301, the preferences information input unit 1501 accepts input of the preferences information. At this time, for example, previously set items are displayed for each layer, as shown in FIG. 26, on the display of the output unit 1272. Then, by the user 1001 selecting displayed items by operating a button in the input unit 1271 and so forth, the items in the next layer is displayed in order, and the preferences information of the user 1001 is input.

In step S302, the preferences information storage unit 1502 stores the preferences information accepted as input in step S301. Thus, for example, the preferences information is stored in the previously set region of the memory 1254.

Thus, the setting processing is executed. Then, when the user 1001 holding the portable device 1002 wherein setting processing has been performed walks or so forth over the signal electrode 1101, advertising can be viewed/listened to appropriate to the preferences of the user 1001, along with the content.

Figure 28:
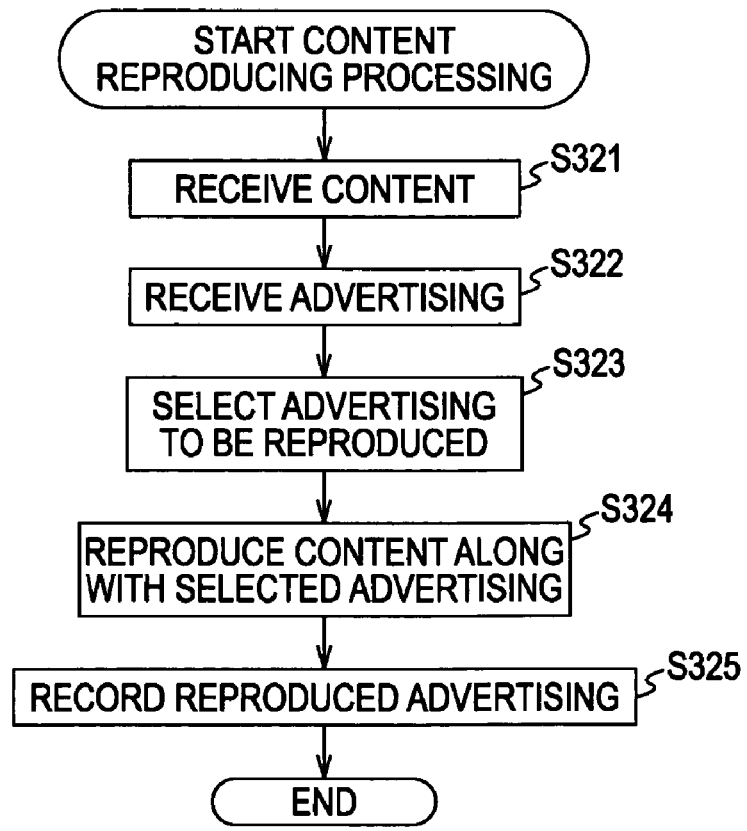
FIG. 28 is a flowchart describing content reproduction processing.

Next, the content reproducing processing will be described with reference to the flowchart in FIG. 28. This processing is executed when the user 1001 holding the portable device 1002 wherein setting processing has been performed walks or so forth over the signal electrode 1101, for example.

In step S321, the content reception unit 1505 receives the content. At this time, for example, the signal corresponding to content data transmitted with the content channel of the signal transmitted from the transmission/reception device 1151 is received, and the data corresponding to this signal, (for example, compression coded image and audio data) is supplied to the reproducing unit 1504.

In step S322, advertising reception unit 1506 receives the advertising. At this time, for example, a predetermined advertising channel corresponding to the information of the destination station is selected from multiple advertising channels of the signal transmitted from the transmission/reception device 1151, and a signal corresponding to the advertising data transmitted with the selected advertising channel is received, the data corresponding to this signal (for example, compression coded image and audio data and the advertising metadata thereof) is supplied to the advertising selecting unit 1503.

In step S323, the advertising selecting unit 1503 selects the advertising to be reproduced from the advertising received in the processing in step S322. At this time, matching is performed between the preferences information stored in the processing in step S302 in FIG. 27 and the information included in the metadata attached to each of the multiple advertising data (for example information about the preferred items), advertising data determined as being appropriate to the preferences of the user 1001 is selected from the multiple advertising data, and only the selected advertising data is output to the reproducing unit 1504.

In step S324, the reproducing unit 1504 reproduces the content data received in the processing in step S322, along with the advertising data selected in the processing in step S323. At this time, for example, the compression coded content data or the advertising data is decoded, the image and audio data is generated, and based on a signal corresponding to this image and audio data, an image is displayed on the display of the output unit 1272 and audio is output from the speaker of the output unit 1272.

It should be noted that the reproducing of the content and advertising assumes streaming reproduction by reproducing the received data in order, but the memory 1254 and so forth can store the data until all of the data is received, and the stored data can be reproduced later.

In step S325, the reproducing unit 1504 records the reproduced advertising. At this time, for example, the information such as that shown in FIG. 29 can be recorded in the memory 1254.

In FIG. 29, the "advertising code" is an ID to identify the advertisement, and the advertising code received in the portable device 1002 (advertising reception unit 1506) is recorded for example in the order received. With the "coupon" in the same diagram, the coupon information included in the advertising is recorded. In this example, the advertising data wherein the advertising code is CMn-1 includes a coupon for providing a discounted product or service to a customer displaying this coupon, and the data wherein the advertising code is CMn-2 includes a coupon for providing cash back (refund of electronic money) to a customer displaying this coupon, and the data wherein the advertising code is CMn-3 does not include a coupon.

Also, the "advertising selection" in FIG. 29 is set as a flag showing whether or not the advertising data corresponding to the advertising code thereof is selected as the advertising data to be reproduced by the advertising selecting unit 1503, and in the case it is selected, the flag is turn "ON", and if it is not selected, the flag is turned "OFF". In other words, with this example, the advertising data whereof the advertising code is CMn-1 is not selected as the advertising data to be reproduced by the advertising selecting unit 1503, and advertising data whereof the advertising code is CMn-2 or CMn-3 is selected as the advertising data to be reproduced by the advertising selecting unit 1503.

The "advertising reproduction" in FIG. 29 is set as a flag showing whether or not the advertising data corresponding to the advertising code thereof is actually reproduced by the reproducing unit 1504, and in the case it is reproduced, the flag is turned "ON", and if it is not reproduced, the flag is turned "OFF". In other words, with this example, the advertising data whereof the advertising code is CMn-1 is not reproduced because it is not selected as the advertising data to be reproduced by the advertising selecting unit 1503, and the advertising data whereof the advertising code is CMn-2 is reproduced because it is selected as the advertising data to be reproduced by the advertising selecting unit 1503, and the advertising data whereof the advertising code is CMn-3 is selected as the advertising data to be reproduced by the advertising selecting unit 1503, but for example is not actually reproduced due to a stop command during reproducing or a low battery or so forth.

Thus, the content and advertising are reproduced, and the information relating to the reproduced advertising is recorded.

It should be noted that with this example, an example is described wherein the content data and advertising data are transmitted from the transmission/reception device 1151 via the signal electrode 1101, but for example, content can be reproduced by the advertising data being transmitted from the transmission/reception device 1151 via the signal electrode 1101, the content data being recorded with a recording medium and so forth, the user 1001 attaching the recording medium on which the content data is recorded to a drive not shown on the portable device 1002 and thus reading out the data recorded on the recording medium.

For example, the recording medium wherein the content data is recorded can be distributed to a user 1001 during a commute to work, whereupon the user 1001 can view and listen to the content stored on the distributed recording medium using the portable device 1002, and can view and listen to an advertisement transmitted from the transmission/reception device 1151 via the signal electrode 1101. In this case, it is desirable for the content data to be encoded and recorded on the recording medium in advance, such that the encoded content data can be decoded by a key obtained by reproducing the advertising data. Thus, the user 1001 may view and listen to the advertising more actively.

As described above, the coupon included in the advertising data is stored in the memory 1254 of the portable device 1002, whereby the user 1001 can visit the store of the advertiser, and by having the coupon information stored on the portable device 1002 read by a terminal and so forth disposed in the shop, the user can receive a discount or a so-called cash back (refund of electronic money) when settling the bill for the product or service.

Figure 30:
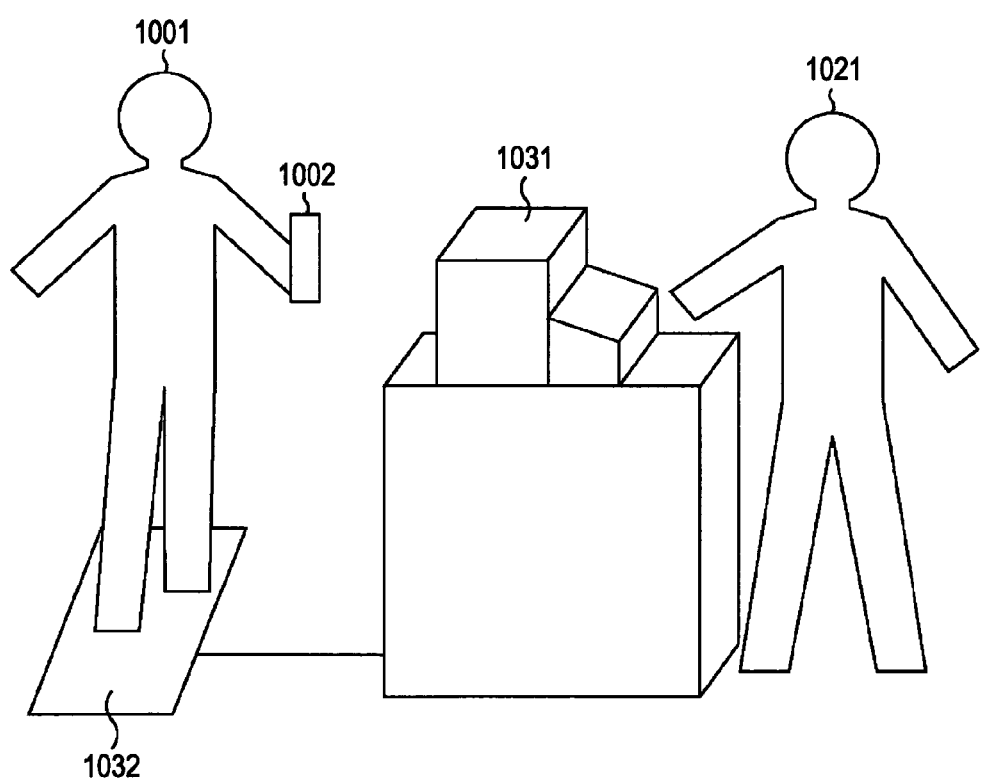
FIG. 30 is a diagram illustrating an example of a terminal disposed in a store.

For example, as shown in FIG. 30, the user 1001 visiting the shop of the advertiser holds the portable device 1002 and stands on the floor wherein the signal electrode 1032 is embedded and so forth. The terminal 1031 disposed in the store has a configuration within which is similar to the transmission/reception device 1151 shown in FIG. 12, and when the store attendant 1021 operates the terminal 1031 disposed in the store, the information stored in the memory 1254 of the portable device 1002 is read by the terminal 1031 via the signal electrode 1032, and the service (discount, cash back, and so forth) corresponding to the coupon is provided.

Figure 31:
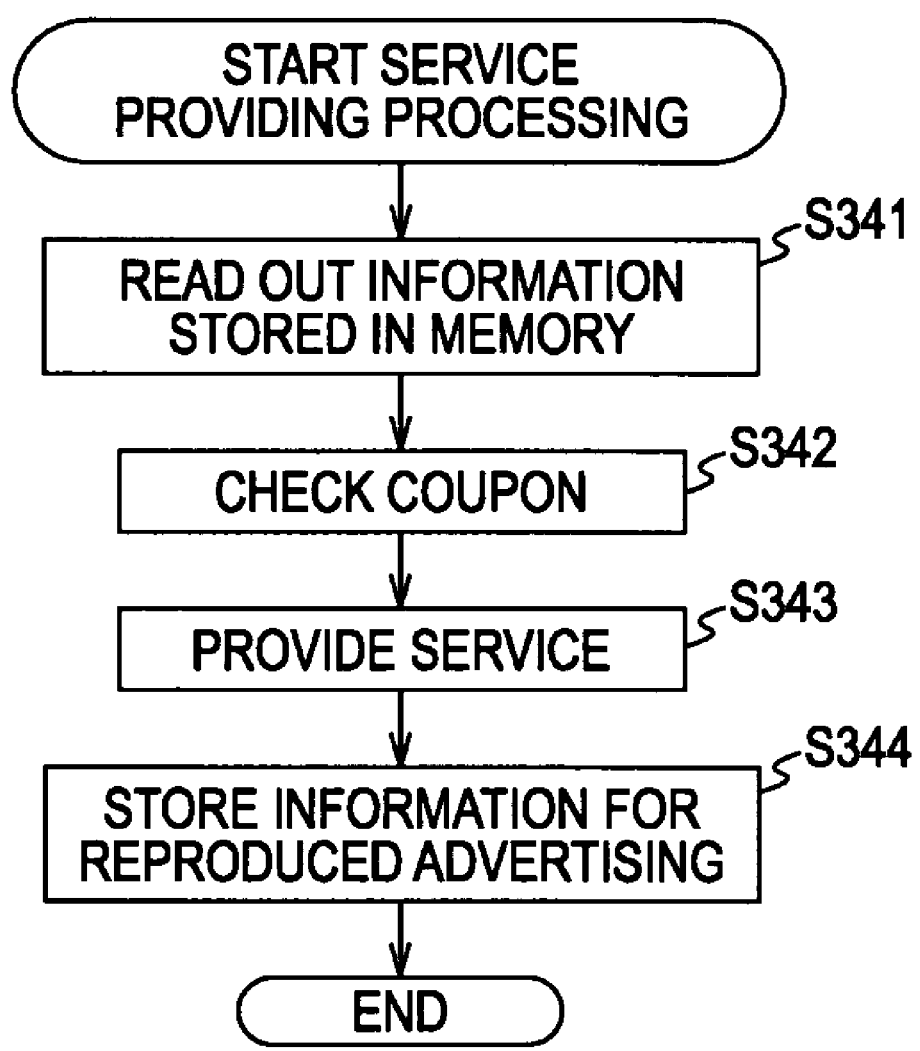
FIG. 31 is a flowchart describing service providing processing.

Next, the service providing processing will be described with reference to the flowchart in FIG. 31. This processing is executed with the terminal 1031 in the store when the user 1001 holding the portable device 1002 visits the store of the advertiser, for example, as shown in FIG. 30.

In step S341, the terminal 1031 reads out the information stored on the memory 1254 of the portable device 1002. At this time, for example, the information such as that described above with reference to FIG. 29 is obtained by the terminal 1031 via the signal electrode 1032.

In step S342, the terminal 1031 checks the coupon within the information read out by the processing in step S341. At this time, for example, from the "coupons" with information such as that described above with reference to FIG. 29, the advertisement coupon wherein the store itself has provided is searched for. Also, when the advertisement coupon wherein the store itself has provided is searched (found), the terminal 1031 can access a verification terminal not shown, for example, and can perform verification with the verification terminal as to whether or not the searched coupon is a valid coupon.

In step S343, the terminal 1031 provides the service corresponding to the coupon checked (searched) in the processing in step S342. Thus, for example, the balance of the electronic money stored in the memory 1254 of the portable device 1002 is added to, and cash back is performed.

In step S344, the terminal 1031 stores the reproduced advertising information included in the information read out from the portable device 1002 with the processing in step S341. At this time, for example, the advertising code is stored for which the "advertising reproducing" flag shown in FIG. 29 is turned "ON".

Alternatively, in the step S344, the selected advertising information can be stored which is included in the information read out from the portable device 1002 with the processing in step S341. At this time, for example, the advertising code is stored for which the "advertising selecting" flag shown in FIG. 29 is turned "ON".

Thus, along with the service providing corresponding to the coupon, the information relating to the reproduction (or selection) of the advertising stored on the portable device 1002 is read, and is stored in the terminal 1031 in the store. Here, an example is described wherein the information relating to the advertising reproduction (or selection) is read from the portable device 1002 held by the user 1001, but of course, information relating to advertising reproduction (or selection) can be similarly read from multiple portable devices held by other multiple users.

Then, the information relating to advertising reproduction (or selection) is transmitted from the terminal 1031 to the managing server 1171, and analysis of the information relating to the advertising reproduction (or selection) is performed in order to perform billing as to the advertiser with the managing server 1171. It should be noted that the transmission of information from the store terminal 1031 to the managing server 1171 can be performed, for example, via an online network such as the Internet, an ISDN (Integrated Services Digital Network), or a private communication line, or the information in the terminal 1031 can be recorded in the recording medium and the information can be sent offline by sending the recording medium.

Figures 32, 33:
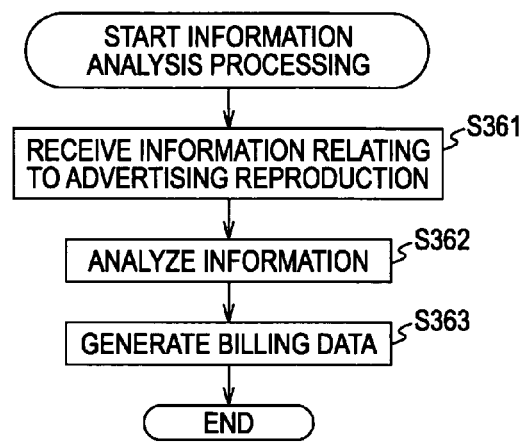
FIG. 32 is a flowchart describing information analysis processing.
FIG. 33 is a diagram illustrating yet another example of information stored in a storage unit of the managing server.

Next, the analysis processing of the information relating to advertising reproduction (or selection) will be described with reference to the flowchart in FIG. 32. This processing can be executed with the managing server 1171 when the information is transmitted from the terminal 1031, either online or offline, for example.

In step S361, the CPU 1501 of the managing server 1171 receives the information relating to the advertising reproduction (or selection). For example, in the case wherein the information is being sent online from the terminal 1031 to the managing server 1171, the information is received via a communication unit 1509, and in the case wherein the information is being sent offline from the terminal 1031 to the managing server 1171, the information is received (obtained) via a recording medium which is attached to a drive 1510 and so forth.

It should be noted that the example described here is in the case that information is transmitted online or offline from the terminal 1031, but in actuality, information is transmitted from multiple terminals disposed in multiple stores to the managing server 1171, and the processing in step S361 is repeatedly executed each time. Also, for example, when information is received from a predetermined number of terminals, the processing advances to step S362.

In step S362, the CPU 1501 analyzes the information received with the processing in step S361. At this time, for example, the information such as that shown in FIG. 33 is generated in the storage unit 1508. In other words, FIG. 33 is a database for researching a predetermined number of advertising viewed and listened to, and with the processing in step S362, the database with the information relating to the advertising reproducing (or selection) is updated by incrementing the value of the number of advertising viewed and listened to one at a time for which the "advertising reproduction" (or "advertising selection") flag is turned "ON".

In step S363, the CPU 1501 generates the billing data based on the analysis results from step S362. At this time, for example, the advertiser of the advertisement is specified based on the advertising code in FIG. 33, the billing amount as to the advertiser is specified based on the value of times of viewing or listening in FIG. 33, and the billing data for each advertiser is generated.

Thus, analysis is performed for information relating to the advertising reproduction (or selection), and billing data is generated. Billing is performed based on the information obtained by collecting information obtained from the individual portable devices, and so more accurate billing can be performed.

Also, an example is described here wherein analysis is performed for information relating to the advertising reproduction (or selection), and billing data is generated based on the analysis results, but data generated based on the analysis results is not limited to billing data. For example, data relating to marketing can be generated based on analysis results relating to the advertising reproduction (or selection).

Further, here an example is described wherein the value of the number of times of viewing/listening in a database for researching a predetermined number of times of advertising viewing/listening is updated with the processing in step S362, but for example, an ID of a portable device having read out information can be attached to the information relating to advertising reproduction (or selection) transmitted from the store terminal, and the ID of the portable device used for viewing/listening to the advertisement can be recorded in the database. Thus, for example, the attributes of the user of the portable device thereof can be analyzed based on the ID of the portable device used for viewing/listening to the advertisement, and more appropriate marketing can be performed.

Here, an example is described wherein analysis is performed for information relating to advertising reproduction (or selection) with the managing server 1171, but analysis can be performed for information relating to advertising reproduction (or selection) with other servers and so forth different from the managing server 1171.

The portable device 1002 can be configured as a portable telephone for example, as described above. Recently, so-called one-segment broadcasting which can be received by a portable telephone is being increasingly used. Here, a one-segment broadcast is a broadcast portable/mobile unit which divides a bandwidth (6 MHz) for one channel of a terrestrial digital broadcast into 13 segments, and uses one of these segments for portable/mobile units provided. By such one-segment broadcasting, television programs, as well as content such as text data or still image data can be provided.

With the above-described example, the example has been described wherein for example, the content and advertising data signal is output from the signal electrode 1101 in FIG. 9, and the portable device 1002 receives this signal, but when the portable device 1002 is configured as a portable telephone, the content and advertising data can be transmitted as a one-segment broadcast, and by the portable telephone (portable device 1002) receiving the one-segment broadcast the content and advertising data can be received.

Also, recently, a non-contact IC card used as a portable telephone and passenger ticket for a train has been configured as one unit, and a service called mobile Suica (registered trademark) has proliferated, which provides services such as passing through an automatic wicket using a portable telephone, or shopping using a portable telephone, and so forth.

In the case that the portable device 1002 is configured as a portable telephone, the above-described passenger ticket can be set as a passenger ticket provided with a mobile Suica. Further, if the above-described content and advertising data is transmitted as a one-segment broadcast, a generic portable telephone which can be purchased on the market can be used as the portable device 1002 and can realize a configuration of the present invention.

Also, with the above-described example, for example, as described above with reference to FIG. 32, an example is described wherein the number of times a content such as advertising is viewed/listened to is analyzed, and billing data or data relating to marketing, and so forth is generated, but if a coupon is attached to the content, the number of times the coupon is used can also be analyzed, so as to generate data relating to marketing and so forth.

The example of counting the number of times that content is viewed/listened to and analyzing personal preferences has often been proposed in the past, and methods have been used to select content according to the analysis results, and further according to personal tastes, and displaying to the users. Analysis is performed by attaching coupons to the content as electronic data, and counting the number of times the coupon is used, whereby even more effective marketing data can be generated. It should be noted that the coupon use mentioned here refers to the user receiving service (discount, cash back, and so forth) providing corresponding to the coupon.

For example, content and advertising data such as that shown in FIG. 34 is stored in the storage unit 1508 of the managing server 1171, and the content and advertising data shown in FIG. 34 is transmitted via a server for one-segment broadcasting connected to the managing server 1171 as one-segment broadcast.

The left side in the diagram of FIG. 34 shows an example of data 2001 configured wherein data for image advertising configured with image data, data for audio advertising configured with audio data, or data for text advertising configured with text information corresponding to data for coupon 1 or coupon 2, and further these data are attached to the metadata 1.

Similarly, the right side in the diagram of FIG. 34 shows an example of data 2002 configured wherein movie content data configured with image data, audio content data configured with audio data, game content data configured with data such as game programs executable on a portable telephone, or text content data configured with text information corresponding to data for coupon 3 or coupon 4, and further these data are attached to the metadata 2.

It should be noted that the data 2001 is data wherein the primary target is advertising of products or services by an advertiser for example, and the data 2002 is data wherein the primary target thereof is providing content for the user to view/listen to for example, and there is no particular difference in the configuration of data 2001 and data 2002. Also, there may be cases wherein advertising information is included in the data 2002 by inserting images, audio, or text of a commercial into the image content through text content.

FIG. 35 shows a configuration example of the metadata shown as metadata 1 or metadata 2 in FIG. 34. As shown in the same diagram, the metadata is configured with content information and coupon information.

The content information includes the attributes "content ID" through "content category information". The attribute "content ID" is an ID for identifying the content included in the data to which this metadata is attached, and the attribute "day created" is information showing the date on which the content is created which is included in the data to which this metadata is attached. Also, the attribute "creator information" is information relating to the creator of the content included in the data to which this metadata is attached, and the attribute "content category information" is information showing the content categories included in the data to which this metadata is attached.

It should be noted that if this metadata is metadata attached to advertising data as with the data 2001, advertising information is inserted in the place of the above-described content information into such metadata. In this case, the attribute "content ID" is an ID for identifying the advertising included in the data to which this metadata is attached, and the attribute "day created" is information showing the date the advertisement is created which is included in the data to which this metadata is attached. Also, the attribute "creator information" is information relating to an advertising creator which is included in the data to which this metadata is attached, and the attribute "content category information" is information showing the categories of the advertising which is included in the data to which this metadata is attached.

A field showing the number of coupons included in the data to be attached to this metadata is provided in the coupon information. Also, the attributes "coupon ID" through "coupon category information" are each included in the coupon information only the number of times that the coupon is shown in the field showing the number of the above-described coupons.

The attribute "coupon ID" is an ID identifying a coupon wherein one coupon is included in the data to which this metadata is attached, and the attribute "day created, effective date" is information showing the creation date of the coupon and the effective date thereof, or can be information showing the creation date of the coupon or the effective date thereof. Also, the attribute "provider information" is information showing the provider of the coupon, and the attribute "coupon category information" is information showing the category of the coupon.

The portable device 1002 having received data such as the data 2001 or data 2002 stores the received data into the memory 12-54, and reproduces the content (or advertising) based on commands by the user 1001 and so forth, as well as displaying information relating to a content creator on the display based on the information included in the above-described metadata as necessary.

Also, when content is reproduced, the portable device 1002 specifies information relating to content such as the content ID or category based on the metadata, and stores this along with the number of times the content is reproduced.

Further, when a coupon is used, the portable device 1002 specifies information relating to the coupon such as the coupon ID or category based on the metadata, and stores this along with the number of times the coupon is used.

Thus, by the content being reproduced and the coupon being used, as shown in FIG. 36, content analysis information generated based on the information relating to the reproduced content, coupon analysis information generated based on the information relating to the used coupons, and analysis information categorized by content and coupons is stored on the memory 1254 of the portable device 1002.

Thus, with the present invention, not only is the user preferences analyzed based on the viewing/listening content or categories as has been performed up to now, but user preferences can be analyzed by also using information relating to the used coupons.

If content can be received with a coupon attached for viewing/listening, it can be thought that the user may view/listen to content to which a coupon is attached for a shop that the user frequents, or actively may view/listen to advertising to which a coupon is attached, for example.

Thus, for example, a given user may be able to obtain preferences information such as "frequents bar A, karaoke box B, restaurant C". In other words, whether a store is frequented is analyzed by the number of times each coupon is used, which counts how many times the coupon of that store is used. As a result, more detailed and specific preferences information can be generated, compared to preferences information as it has been up to now wherein analysis is made based on the viewed/listened to content categories.

FIG. 37 is a diagram showing an example of the coupon analysis information in FIG. 36. The same diagram is an example of coupon analysis information generated by corresponding the coupon ID of the used coupon to the number of times used, and storing this. The coupon ID is information described in the attribute "coupon ID" of the coupon information of the metadata described above with reference to FIG. 35. The coupon can be specified with the coupon ID, so by generating coupon analysis information such as that shown in FIG. 37, which coupon is more often used can be determined. By obtaining coupon analysis information such as that in FIG. 37 from the managing server 1171 for example and analyzing this, content data with more often used coupons attached can be collected and transmitted to (the users of) the portable devices 1002.

FIG. 38 is a diagram showing another example of the coupon analysis information in FIG. 36. The same diagram is an example of coupon analysis information generated by corresponding the coupon provider information (in this case, the store code identifying the store which provided the coupon) of the used coupon to the number of times used, and storing this. Also, as shown in FIG. 39, coupon analysis information can be generated by storing the information of the provider of the used coupon while corresponding the store code identifying the store supplying the coupon and the region code identifying the location of the store with the number of times used. It should be noted that the store code or the region code is information described in the attribute "provider information" in the coupon information of the metadata described above with reference to FIG. 35.

The coupon analysis information as in FIG. 38 or 39 can be obtained by the managing server 1171 and analyzed, for example, and the preferences of the user of the portable device 1002 can be analyzed with greater detail.

By analyzing the coupon analysis information as in FIG. 38 or 39, for example, let us say it has been determined that the user frequents a convenience store A in region E, but does not frequent convenience store B. In such a case, it is desirable for content attached to a coupon for convenience store A to be transmitted more frequently to the portable device of this user.

Also, by analyzing the coupon analysis information as in FIG. 38 or 39, for example, let us say it has been determined that the user frequents the convenience store A but only frequent the convenience store A in specified locations such as near the home of the user. In such a case, rather than content including a coupon for the convenience store A, it is desirable to transmit more content wherein coupons are attached for specified locations (regions) such as near the home of the user, to the portable device of this user. For example, even if it is a coupon for the convenience store B which differs from the convenience store A, if the convenience store B is in a specified location (region), this is useful to the user, and also the probability of the user becoming a new customer is great for the convenience store B, and thus the advertising effectiveness is great.

FIG. 40 is a diagram showing yet another example of the coupon analysis information in FIG. 36. The same diagram is an example of coupon analysis information generated by storing the information of the used coupon category (in this case, information showing the type of store providing the coupon) corresponded to the number of times the coupon is used. Also, as shown in FIG. 41, coupon analysis information can be generated by storing the information of the used coupon category as information showing the detailed type of store that provided the coupon, corresponding this to the number of times the coupon is used. It should be noted that the information showing store types in FIG. 40 or 41 is information described in the attribute "coupon category information" of the coupon information of the metadata described above with reference to FIG. 35.

By obtaining and analyzing the coupon analysis information as in FIG. 40 or 41 with the managing server 1171 for example, the preferences of the user of the portable device 1002 can be analyzed in greater detail.

For example, by analyzing the coupon analysis information as in FIG. 40 or 41, what type of store the user frequents, and particularly, even within the same category of store, the store with what characteristics the user frequents, can be determined. Accordingly, more appropriate coupons can be provided to the user of the portable device 1002.

Thus, by transmitting content or advertising data with coupons attached according to the preferences of the user, the probability is increased of the user viewing/listening to the content or advertising.

Normally, a user will view/listen to content the user likes without being concerned about the inserted commercials within the content. Therefore, the probability of the user viewing/listening to the commercials inserted in the content the user likes increases. However, having a user view/listen to individual advertising or unpopular content may be difficult. Thus, transmitting the content or advertising data with a coupon attached can be considered, but when downloading content and so forth, the amount of downloadable data is limited by the memory capacity of the portable device and so forth, so the user becomes more careful about downloading, and may not be downloaded any content or advertising simply because a coupon is attached.

With the present invention, user preferences can be analyzed in detail, based on the coupon analysis information, and therefore by transmitting data attached with a coupon appropriate to the user preferences, the probability is greater for the user to view/listen. As a result, content with merit for the content or advertising provider and for the user can be provided. In particular, in the case of distributing content which is so-called on-demand content, for example, which is content distribution (transmission) that is not of the so-called push type, it is desirable to analyze the preferences of the user in detail, as with the present invention.

By transmitting the data such as that described above with reference to FIG. 34, for example, the burden of cost for creating and transmitting and so forth the content changes for the content provider. Here, the costs relating to the creation and transmission of content may include fees necessary for creating content, such as labor cost to be paid to actors appearing in the content, as well as content distribution costs to be paid to those persons performing content distribution service (in this case, the manager (business operator) of the managing server 1171) by those persons providing the content, or also coupon attaching fees to be paid to those persons performing content distribution service by those persons providing the coupons.

For example, in the case of content wherein the advertiser becomes a sponsor and a commercial or so forth of the sponsor is included in the content, the advertiser providing the content desires to advertise to a large number of people, of course, and so would transmit advertising with a coupon benefiting the user. The cost associated with the creation or transmission and so forth of the content or advertising is generally borne by the advertiser, but the coupon providing cost, that is to say, the amount to be discounted by the coupon is not necessarily all borne by the advertiser.

For example, an advertiser desiring to advertise a new type of television may perform marketing in advance, and analyze what types of preferences a person has that would desires to purchase a new type of television. Then with such marketing, for example, it may be discovered that persons desiring to purchase a new type of television often rent DVDs at rental shops.

In such a case, the advertiser may obtain a coupon with only a 100 yen discount off the DVD rental rate from a rental shop A. The user views/listens to the advertising for the new type of television, obtains the coupon, displays this at the rental shop A, and rents a DVD with a 100 yen discount. At this time, the rental shop A does not lose the 100 yen, but can expect the user to come to the shop and rent many other items or purchase other items, and so even with bearing some of burden of the coupon providing cost (in this case, 100 yen per coupon) there is no loss.

Alternatively, a rental shop B that is relatively unknown may expect many users to view/listen to the advertising for the new type of television and obtain the coupon and visit the shop thereof, thereafter expecting the user to frequent the rental shop B, and so may bear the entire cost of providing the coupons, or may even bear a portion of the cost associated with the creation or transmission or so forth of the content or advertising.

On the other hand, for example, a coupon for a popular shop may be desired by a user. Accordingly, a coupon for a popular store may be provided at a high price to the advertiser, and also popular content is viewed/listened to by a greater number of users, and so many coupon providers can be expected to bear a large amount of cost (cost borne associated with the creation or transmission or the like).

Thus, by transmitting content or advertising data with coupons attached, a portion of the cost associated with the creation or transmission of content or advertising can be borne by the coupon provider, and further, by appropriately selecting the type of coupon to be attached to the content or advertising data, the amount of cost burden for the creation or transmission of content or advertising and so forth can also be adjusted.

Alternatively, the entire cost associated with the creation or transmission of content or advertising can be borne by the provider of the coupon. In such a case, in order to control the cost burden, may provide a coupon such as a raffle instead of a coupon for a discount, for example. If the coupon provider bears the entire cost associated with the creation or transmission of content or advertising, inserting commercials and so forth in the content becomes unnecessary, and the user viewing/listening to the content thereof can relax and enjoy the content.

Thus, by transmitting content or advertising data with coupons attached, content or advertising can be provided with various methods, and for example the quality of content can also be expected to improve.

It should be noted that the above-described string of processing can be executed with hardware, or can be executed with software. If executing the above-described string of processing with software, the program configuring the software is installed into a computer integrated with specialized hardware, or into a general-use personal computer for example, capable of executing various functions by installing various programs, by the network or the recording medium.

If executing the above-described string of processing with software, the program configuring the software is installed from a network such as the Internet or a recording medium such as removable media.

It should be noted that this recording medium can be configured with removable media such as a magnetic disk (including a floppy disk (registered trademark)), optical disk (including a CD-ROM (Compact Disk-Read Only Memory), and DVD (Digital Versatile Disk)), optical-magnetic disk (including an MD (Mini-Disk)), or semiconductor memory, on which is recorded a program and distributed for distributing the program to the user, but also can include configurations such as a hard disk included in the storage unit or a ROM whereupon a program is recorded, which is distributed to the user in the state of being built into the device main unit.

The steps for executing the series of processing described above in the present specification include processing performed in time sequence in the order described, as a matter of course, but is not restricted thereto, and also encompasses arrangements wherein the processing is not necessarily performed in time sequence, but executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device for transmitting information to be provided to a user to a terminal held by said user, comprising:
    current position obtaining means for obtaining the current position of the user of said terminal;
    information obtaining means for obtaining location information related to said user's destination from said terminal, based on information corresponding to a passenger ticket for a transportation mode, stored in said terminal, when said user uses said transportation mode;
    searching means for searching information related to a product or service to be provided to said user in the vicinity of an establishment of said transportation mode that said user can reach with said passenger ticket, based on the current position of the user, and on the location information related to the user's destination, wherein the information searched by said searching means includes advertising directed at said user;
    transmission means for transmitting the search results of said searching means to said terminal, wherein the search results indicate that a provider of a product or service to be provided to said user provides a predetermined service to a user holding said terminal storing said information that differs from a service provided to a user not holding said terminal storing said information; and
    billing information generating means for generating billing information for the advertiser corresponding to the transmission of said advertisement when said advertisement is transmitted to said terminal by said transmission means.

2. The information processing device according to claim 1, wherein information indicating that the predetermined service is to be provided is transmitted as an attachment to content data transmitted to said terminal.

3. The information processing device according to claim 2, wherein;
    when the information indicating that the predetermined service is to be provided is displayed to the provider of said product or service, said terminal stores the information showing that the information indicating said predetermined service to be provided is displayed on said terminal;
    the information showing that the information indicating that said predetermined service is to be provided is obtained from said terminal; and
    information is generated to show the preferences of the user holding said terminal, based on said obtained information.

4. The information processing device according to claim 1, wherein content data is transmitted to said terminal as a one segment broadcast.

5. The information processing device according to claim 1, wherein the search results are displayed to said user via said terminal.

6. The information processing device according to claim 5, wherein information is recorded in said terminal identifying information that has been displayed to said user via said terminal, said information processing device further comprising user display information means for recording in said terminal the information identifying information that has been displayed to said user via said terminal.

7. The information processing device according to claim 6, wherein said user display information obtaining means is provided on a device for providing a predetermined service to said user, and at the time of said predetermined service being provided to said user, information is obtained identifying information that has been displayed to said user via said terminal in which terminal said information is recorded.

8. The information processing device according to claim 1, wherein said searching means searches information related to a product or service to be provided to said user in the vicinity of a second establishment of said transportation mode at a further distance from the first establishment of said transportation mode that said user can reach with said passenger ticket.

9. The information processing device according to claim 8, wherein the search results include information verifying that the provider of the product or service to be provided to said user in the vicinity of the second establishment will bear the cost of said user being transported to the second establishment of said transportation mode at a further distance from said first establishment using said transportation mode.

10. The information processing device according to claim 1, wherein the information searched by said searching means includes information relating to a usage method of said transportation mode.

11. The information processing device according to claim 1, wherein the information searched by said searching means includes information relating to the time required for transportation by said transportation mode.

12. The information processing device according to claim 1, wherein said searching means searches map information on the travel route from a departure point of said passenger ticket to the destination of said passenger ticket.

13. The information processing device according to claim 12, wherein when the current position obtained by said current position obtaining means is within a predetermined area surrounding a predetermined point on the travel path, a warning is output to said user via said terminal.

14. The information processing device according to claim 1, said processing device and said terminal each further comprising:
   a reference electrode for obtaining a reference point for determining an output value when said reference electrode is electrostatically coupled to a communication medium; and
   a signal electrode that, when said reference electrode is electrostatically coupled to the communication medium, is more strongly coupled to the communication medium than said reference electrode; wherein
   communication is performed between said processing device and said terminal based on the electric potential difference occurring between said reference electrode and said signal electrode.

15. The information processing device according to claim 14, wherein said communication medium is a human body.

16. An information processing method for an information processing device which transmits information to be provided to a user, to a terminal held by said user, said information processing method comprising the steps of:
   obtaining the current position of the user of said terminal;
   obtaining location information related to said user's destination from said terminal, based on information corresponding to a passenger ticket for a transportation mode, stored in said terminal, when said user uses said transportation mode;
   searching information related to a product or service to be provided to said user in the vicinity of an establishment of said transportation mode that said user can reach with said passenger ticket, based on the current position of the user, and on the location information related to the user's destination, wherein the information searched includes advertising directed at said user;
   transmitting the search results to said terminal, wherein the search results indicate that a provider of a product or service to be provided to said user provides a predetermined service to a user holding said terminal storing said information that differs from a service provided to a user not holding said terminal storing said information; and
   generating billing information for the advertiser corresponding to the transmission of said advertisement when said advertisement is transmitted to said terminal.

17. A non-transitory, computer-readable storage medium storing a program which, when executed by a processor, causes an information processing device which transmits information to be provided to a user, to a terminal held by said user, to perform an information processing method, the method comprising the steps of:
   obtaining the current position of the user of said terminal;
   obtaining location information related to said user's destination from said terminal, based on information corresponding to a passenger ticket for a transportation mode, stored in said terminal, when said user uses said transportation mode;
   searching information related to a product or service to be provided to said user in the vicinity of an establishment of said transportation mode that said user can reach with said passenger ticket, based on the current position of the user, and on the location information related to the user's destination, wherein the information searched includes advertising directed at said user;
   transmitting the search results to said terminal, wherein the search results indicate that a provider of a product or service to be provided to said user provides a predetermined service to a user holding said terminal storing said information that differs from a service provided to a user not holding said terminal storing said information; and
   generating billing information for the advertiser corresponding to the transmission of said advertisement when said advertisement is transmitted to said terminal.

18. An information processing device for transmitting information to be provided to a user to a terminal held by said user, comprising:
   a current position obtaining unit for obtaining the current position of the user of said terminal;
   an information obtaining unit for obtaining location information related to said user's destination from said terminal, based on information corresponding to a passenger ticket for a transportation mode, stored in said terminal, when said user uses said transportation mode;
   a searching unit for searching information related to a product or service to be provided to said user in the vicinity of an establishment of said transportation mode that said user can reach with said passenger ticket, based on the current position of the user, and on the location information related to the user's destination, wherein the information searched by said searching unit includes advertising directed at said user;
   a transmission unit for transmitting the search results of said searching unit to said terminal, wherein the search results indicate that a provider of a product or service to be provided to said user provides a predetermined service to a user holding said terminal storing said information that differs from a service provided to a user not holding said terminal storing said information; and
   a billing information generating unit for generating billing information for the advertiser corresponding to the transmission of said advertisement when said advertisement is transmitted to said terminal by said transmission unit.

* * * * *